US010677387B2

(12) United States Patent
Han et al.

(10) Patent No.: US 10,677,387 B2
(45) Date of Patent: Jun. 9, 2020

(54) ELECTRONIC DEVICE INCLUDING STAND MEMBER

(71) Applicant: Samsung Electronics Co., Ltd., Suwon-si, Gyeonggi-do (KR)

(72) Inventors: Yonghwa Han, Suwon-si (KR); Chungkeun Yoo, Suwon-si (KR); Hyosung Kang, Suwon-si (KR); Jungbae Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/544,205

(22) Filed: Aug. 19, 2019

(65) Prior Publication Data

US 2020/0124229 A1 Apr. 23, 2020

(30) Foreign Application Priority Data

Oct. 23, 2018 (KR) .................. 10-2018-0126903

(51) Int. Cl.
*F16M 13/00* (2006.01)
*G06F 1/16* (2006.01)
*H04M 1/04* (2006.01)

(52) U.S. Cl.
CPC .......... *F16M 13/005* (2013.01); *G06F 1/166* (2013.01); *G06F 1/1681* (2013.01); *G06F 1/1626* (2013.01); *H04M 1/04* (2013.01)

(58) Field of Classification Search
None
See application file for complete search history.

(56) References Cited

U.S. PATENT DOCUMENTS 5,666,694 A * 9/1997 Slow .................. G06F 1/1618
16/308
6,430,038 B1 * 8/2002 Helot .................. G06F 1/1616
248/917

(Continued)

FOREIGN PATENT DOCUMENTS

JP         05-282071 A       10/1993
KR   10-2014-0010571 A        1/2014
WO      2019/107701 A1        6/2019

OTHER PUBLICATIONS

International Search Report and Written Opinion Report dated Nov. 27, 2019, issued in International Application No. PCT/KR2019/010505.

(Continued)

*Primary Examiner* — Xanthia C Cunningham
(74) *Attorney, Agent, or Firm* — Jefferson IP Law, LLP

(57) ABSTRACT

An electronic device including a hinge structure disposed on a plate, and a stand member disposed to be rotated at a predetermined angle from the plate by using the hinge structure, is provided. The hinge structure includes a base member including at least one guide hole, a first rotatable member disposed on the base member and rotatable about a first axis, a second rotatable member disposed on the first rotatable member and rotatable about the first axis, and fixed to the stand member, at least one link each including one portion rotatably arranged with respect to a second axis disposed near the first axis, another portion guided through the at least one guide hole in accordance with a movement of the second axis, and a torque generating structure including an axis coinciding with the second axis, and providing a torque in accordance with a rotation of the second rotatable member.

20 Claims, 38 Drawing Sheets

(56) References Cited

U.S. PATENT DOCUMENTS

| | | | | |
|---|---|---|---|---|
| 7,203,059 B1* | 4/2007 | Kramer | ............... | G06F 1/1616 210/303 |
| 7,567,436 B2* | 7/2009 | Jeong | ............... | F16M 11/10 16/221 |
| 7,766,288 B2* | 8/2010 | Kim | ............... | F16M 11/105 248/176.1 |
| 8,004,833 B2* | 8/2011 | Tseng | ............... | G06F 1/1616 361/679.26 |
| 8,336,168 B2* | 12/2012 | Huang | ............... | G06F 1/1681 16/340 |
| 8,483,784 B2* | 7/2013 | Griffin | ............... | H04M 1/022 16/343 |
| 8,773,849 B2* | 7/2014 | Bohn | ............... | H04M 1/022 361/679.27 |
| 8,843,183 B2* | 9/2014 | Griffin | ............... | G06F 1/1616 455/575.1 |
| 9,201,466 B2* | 12/2015 | Lai | ............... | G06F 1/1681 |
| 9,436,229 B2* | 9/2016 | Yoo | ............... | G06F 1/1637 |
| 2002/0145847 A1* | 10/2002 | Crosby | ............... | F16M 11/10 361/679.02 |
| 2005/0052831 A1* | 3/2005 | Chen | ............... | G06F 1/1616 361/679.11 |
| 2005/0083644 A1* | 4/2005 | Song | ............... | G06F 1/162 361/679.06 |
| 2006/0274490 A1* | 12/2006 | Cheng | ............... | G06F 1/1616 361/679.07 |
| 2007/0143962 A1 | 6/2007 | Lu et al. | | |
| 2007/0217131 A1* | 9/2007 | Kehr | ............... | G06F 1/162 361/679.27 |
| 2008/0024975 A1* | 1/2008 | Huang | ............... | G06F 1/162 361/679.44 |
| 2008/0232054 A1* | 9/2008 | Chen | ............... | G06F 1/1616 361/679.07 |
| 2009/0086424 A1* | 4/2009 | Jette | ............... | G06F 1/1601 361/679.55 |
| 2009/0320245 A1 | 12/2009 | Wang et al. | | |
| 2010/0299873 A1* | 12/2010 | Song | ............... | G06F 1/1624 16/236 |
| 2011/0038108 A1* | 2/2011 | Chang | ............... | G06F 1/162 361/679.01 |
| 2012/0229962 A1* | 9/2012 | Chen | ............... | G06F 1/162 361/679.01 |
| 2014/0043749 A1* | 2/2014 | Lai | ............... | G06F 1/162 361/679.27 |
| 2015/0173219 A1* | 6/2015 | Hale | ............... | F16M 11/041 16/225 |
| 2015/0362958 A1* | 12/2015 | Shang | ............... | G06F 1/1681 361/679.58 |
| 2016/0320811 A1 | 11/2016 | Lin | | |
| 2016/0369543 A1 | 12/2016 | Park | | |
| 2017/0255235 A1 | 9/2017 | Wu et al. | | |
| 2018/0081404 A1 | 3/2018 | Schafer et al. | | |
| 2018/0230724 A1 | 8/2018 | Lin et al. | | |

OTHER PUBLICATIONS

European Search Report dated Mar. 13, 2020, issued in European Application No. 19202818.1-1203.

* cited by examiner

ELECTRONIC DEVICE INCLUDING STAND MEMBER

CROSS-REFERENCE TO RELATED APPLICATION(S)

This application is based on and claims priority under 35 U.S.C. 119(a) of a Korean patent application number 10-2018-0126903, filed on Oct. 23, 2018, in the Korean Intellectual Property Office, the disclosure of which is incorporated by reference herein in its entirety.

BACKGROUND

1. Field

The disclosure relates to an electronic device including a stand member.

2. Description of Related Art

With the growth of electronic and communication industries, a great variety of electronic devices such as mobile communication terminals (e.g., a smart phone, a tablet personal computer (PC)), electronic organizers, personal hybrid terminals, or laptop computers have been popularized. Recently, many electronic devices realize a graphical user interface (GUI) environment through a touch screen to facilitate user's accessibility and provide various multimedia contents based on a web environment.

Such electronic devices can each have inherent device characteristics and features in use. For example, a tablet PC has a larger display than a smart phone, thus being suitable for providing users with multimedia contents on a larger screen. An electronic device, such as a tablet PC, is favorable for display to a user when it is mounted on a separate stand member (or a mounting member or a holder) at a certain angle rather than mounted on a horizontal surface (e.g., a table or a desk).

The stand member may be rotatably attached to at least a portion of the electronic device through at least one hinge structure. Normally, such a hinge structure may be composed of a complicated gear mechanism and compressive springs to allow the stand member to be unfolded at a certain angle from the electronic device.

However, this hinge structure is problematic in that the gear mechanism is easily worn out due to frequent use of the stand member, thereby remarkably reducing the operating precision of the stand member and lowering the reliability of the product. In addition, such a hinge structure may be difficult to open the stand member from the electronic device because it provides a strong torque in all operating zones of the overall opening angle.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a stand member.

Additional aspects will be set forth in part in the description which follows and, in part, will be apparent from the description, or may be learned by practice of the presented embodiments.

In accordance with an aspect of the disclosure, an electronic device is provided. The electronic device includes a hinge structure configured to ensure operational reliability even in frequent and/or long use of a stand member.

In accordance with another aspect of the disclosure, an electronic device is provided. The electronic device includes a stand member with improved convenience of manipulation.

In accordance with another aspect of the disclosure, an electronic device is provided. The electronic device includes a housing including a first plate facing in a first direction, a second plate facing in a second direction opposite to the first direction, and a lateral member surrounding a space between the first plate and the second plate, at least one hinge structure disposed on at least a portion of the second plate, and a stand member disposed to be rotated at a predetermined angle from the second plate through the hinge structure. The hinge structure may include a base member disposed on the second plate and including at least one guide hole, a first rotatable member disposed on the base member to be rotatable about a first rotational axis, a second rotatable member disposed on the first rotatable member to be rotatable about the first rotational axis, and fixed, at least in part, to the stand member, at least one link each including one portion thereof rotatably arranged with respect to a second rotational axis disposed near the first rotational axis, and including another portion thereof guided through the guide hole in accordance with a movement of the second rotational axis, and a torque generating structure including an axis coinciding with the second rotational axis, and providing a torque in accordance with a rotation of the second rotatable member.

In accordance with another aspect of the disclosure, an electronic device is provided. The electronic device includes a housing including a first plate facing in a first direction, a second plate facing in a second direction opposite to the first direction, and a lateral member surrounding a space between the first plate and the second plate, at least one hinge structure disposed on at least a portion of the second plate, and a stand member disposed to be rotated at a predetermined angle from the second plate through the hinge structure. The hinge structure may include a base member disposed on the second plate and including at least one guide hole, a first rotatable member disposed on the base member to be rotatable about a first rotational axis, a second rotatable member disposed on the first rotatable member to be rotatable about the first rotational axis, and fixed, at least in part, to the stand member, at least one link each including one portion thereof rotatably arranged with respect to a second rotational axis disposed near the first rotational axis, and including another portion thereof guided through the guide hole in accordance with a movement of the second rotational axis, and a torque generating structure including an axis coinciding with the second rotational axis, and providing a torque in accordance with a rotation of the second rotatable member. The torque generating structure may include a rotating shaft inserted into a pair of hinge arms formed in the second rotatable member, a cam washer engaging with the rotating shaft, a cam link engaging with the rotating shaft and being, at least partly, in surface contact with the cam washer, at least one spring disposed to receive a pressure from the cam link, at least one washer engaging with the rotating shaft and disposed to receive a pressure from the at least one spring, at least one link engaging with the rotating shaft and being, at least partly, in surface contact with the at least one washer, and a guide shaft engaging with the cam link and the at least one link and disposed to be guided along the guide hole of the base member. The hinge structure may generate a primary torque through a surface pressure between the at least one washer and the at least one link which are pressed by the at least one spring through a cam operation of the cam washer and the cam link in accordance with a rotation of the stand member, and also generate a secondary torque by forcibly converting a motion of the guide shaft, which is going to rotate together with the stand member, into a rectilinear motion guided along the guide hole.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
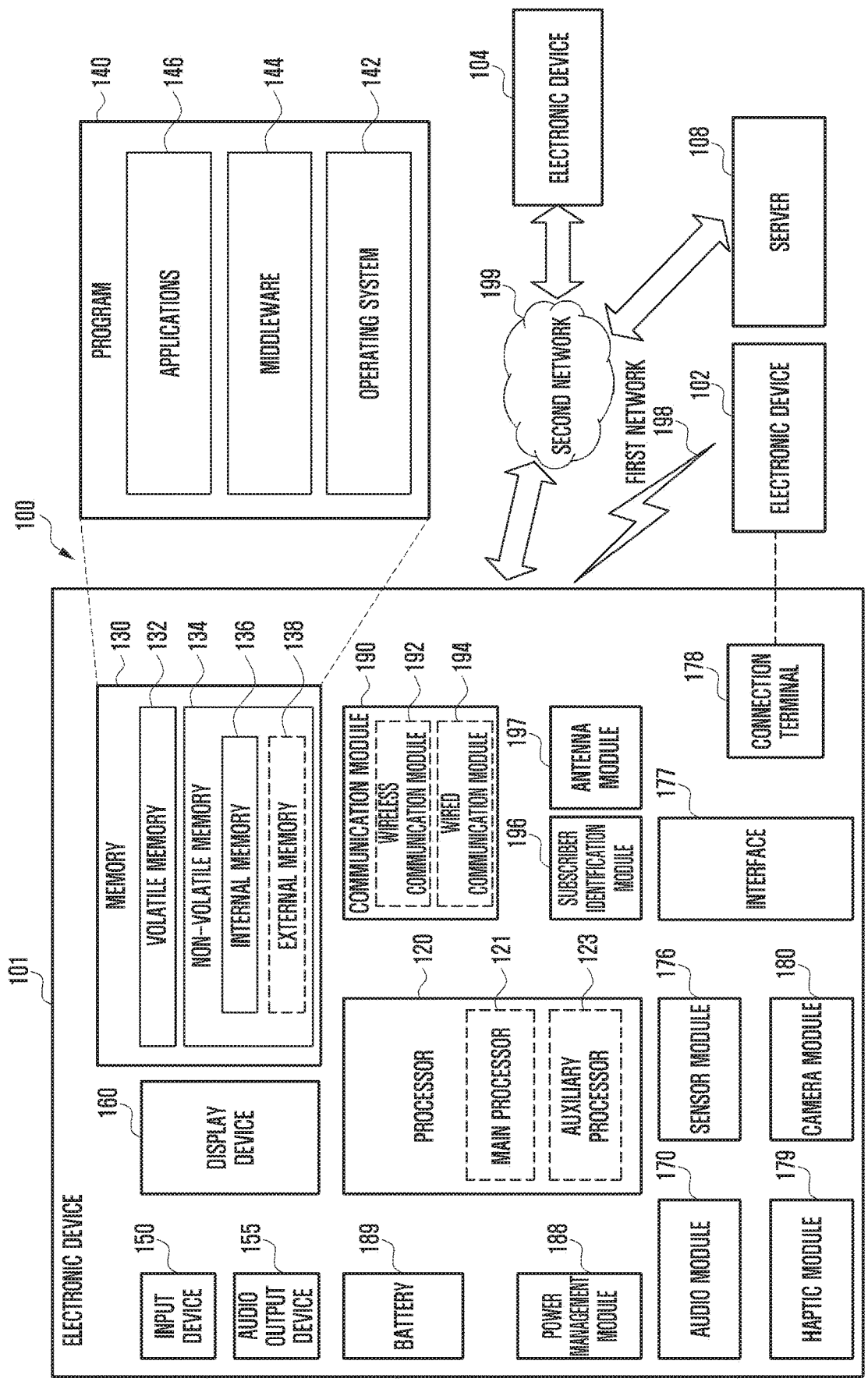
FIG. 1 is a block diagram illustrating an electronic device in a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, or projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the audio output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wi-Fi direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
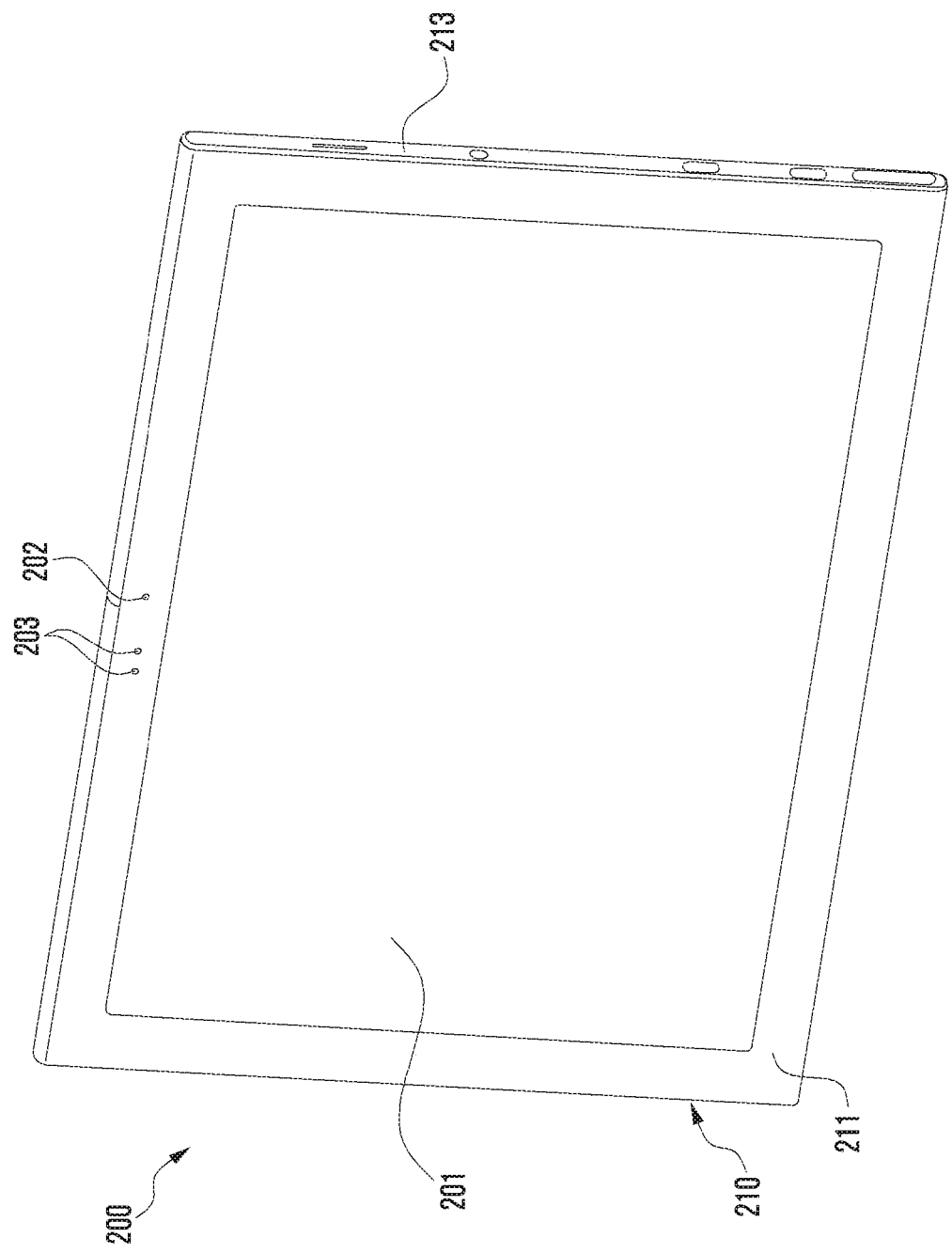
FIGS. 2A and 2B are perspective views showing a folded state in which a stand member is folded to a housing in an electronic device according to various embodiments of the disclosure.
Figure 2B:
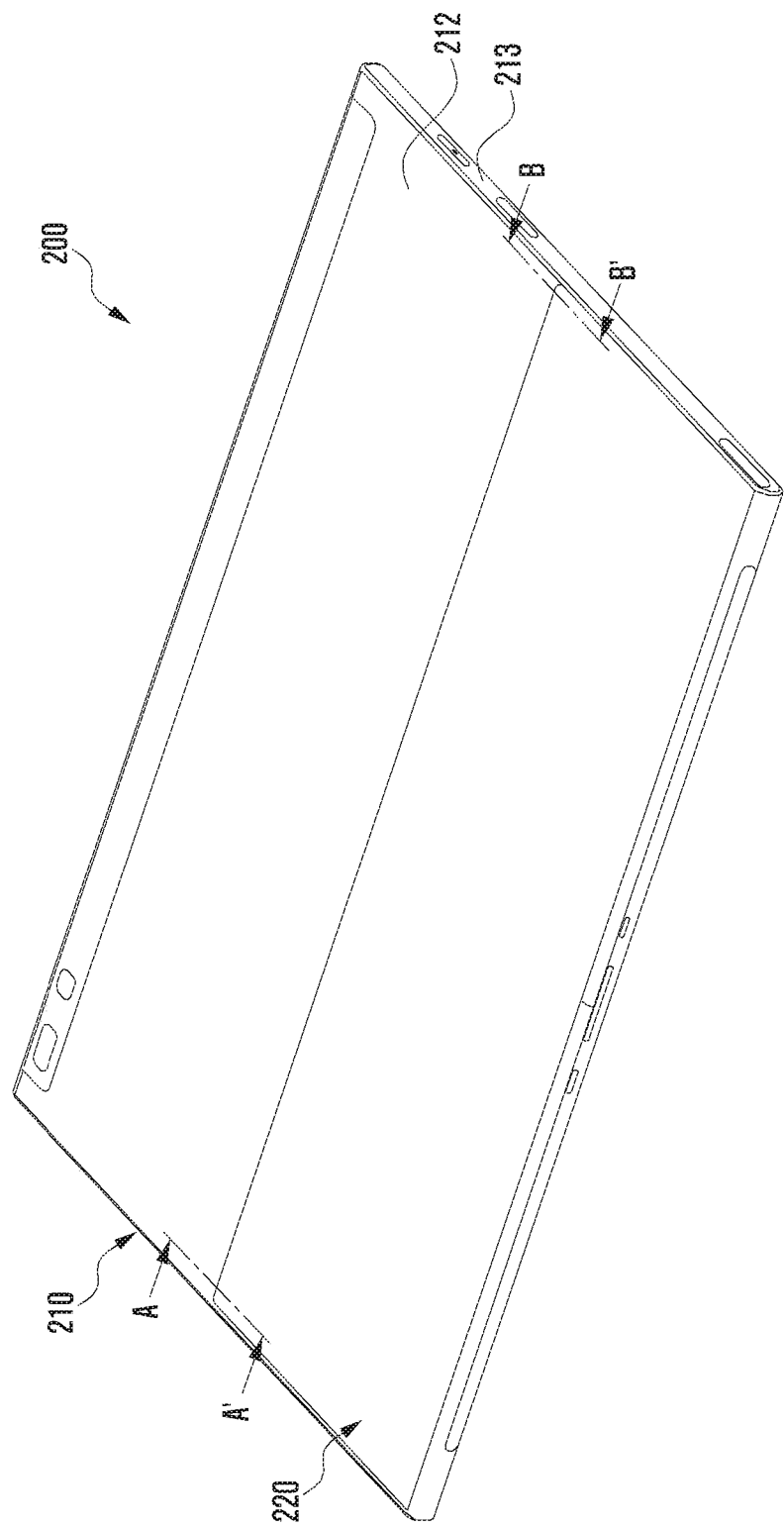

FIGS. 2A and 2B are perspective views showing a folded state in which a stand member 220 is folded to a housing 210 in an electronic device 200 according to various embodiments of the disclosure.

The electronic device 200 shown in FIGS. 2A and 2B may be similar, at least in part, to the electronic device 101 shown in FIG. 1, or may include an electronic device according to other embodiments.

Referring to FIGS. 2A and 2B, the electronic device 200 may include the housing 210 (also referred to as a main body or a main device part) and the stand member 220 (also referred to as a mounting member or a holder). The housing 210 may include a first plate 211 (e.g., a front plate) facing in a first direction, a second plate 212 (e.g., a rear plate) facing in a second direction opposite to the first direction, and a lateral member 213 surrounding a space between the first plate 211 and the second plate 212. The stand member 220 is disposed to be opened or closed at a predetermined angle (e.g., a first angle (θ1) in FIG. 2C or a second angle (θ2) in FIG. 2E) from the housing 210. According to an embodiment, the second plate 212 and the lateral member 213 may be formed of separate components or integrally formed with each other. For example, the lateral member 213 may be bent at an angle from and integrally formed with edges of the second plate 212. According to an embodiment, the first plate 211 may include a substantially transparent glass or polymer plate. According to an embodiment, the second plate 212, the lateral member 213, and/or the stand member 220 may be formed of coated or colored glass, ceramic, polymer, metal (e.g., aluminum, stainless steel (STS), or magnesium), or a combination thereof.

According to various embodiments, the electronic device 200 may include a display 201 disposed in an internal space of the housing 210 to be visible outwardly through at least a portion of the first plate 211. According to an embodiment, the display 201 may include a flexible display. According to an embodiment, the display 201 may include a touch screen display having a touch sensor. According to an embodiment, the display 201 may be disposed to be seen outwardly through the substantially entire area of the first plate 211. According to an embodiment, the electronic device 200 may include at least one camera module 202 and at least one sensor module 203, which are disposed on at least a portion of the first plate 211. According to an embodiment, the at least one sensor module 203 may generate an electrical signal or data value corresponding to an internal operating state of the electronic device 200 or to an external environmental condition. The at least one sensor module 203 may include at least one of an illuminance sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a proximity sensor.

According to various embodiments, although not shown, the electronic device 200 may include at least one key input device exposed, at least in part, outwardly, and sound input/output devices (e.g., a microphone device and a speaker device). In a certain embodiment, the electronic device 200 may include at least one antenna disposed in the internal space thereof.

Figure 2C:
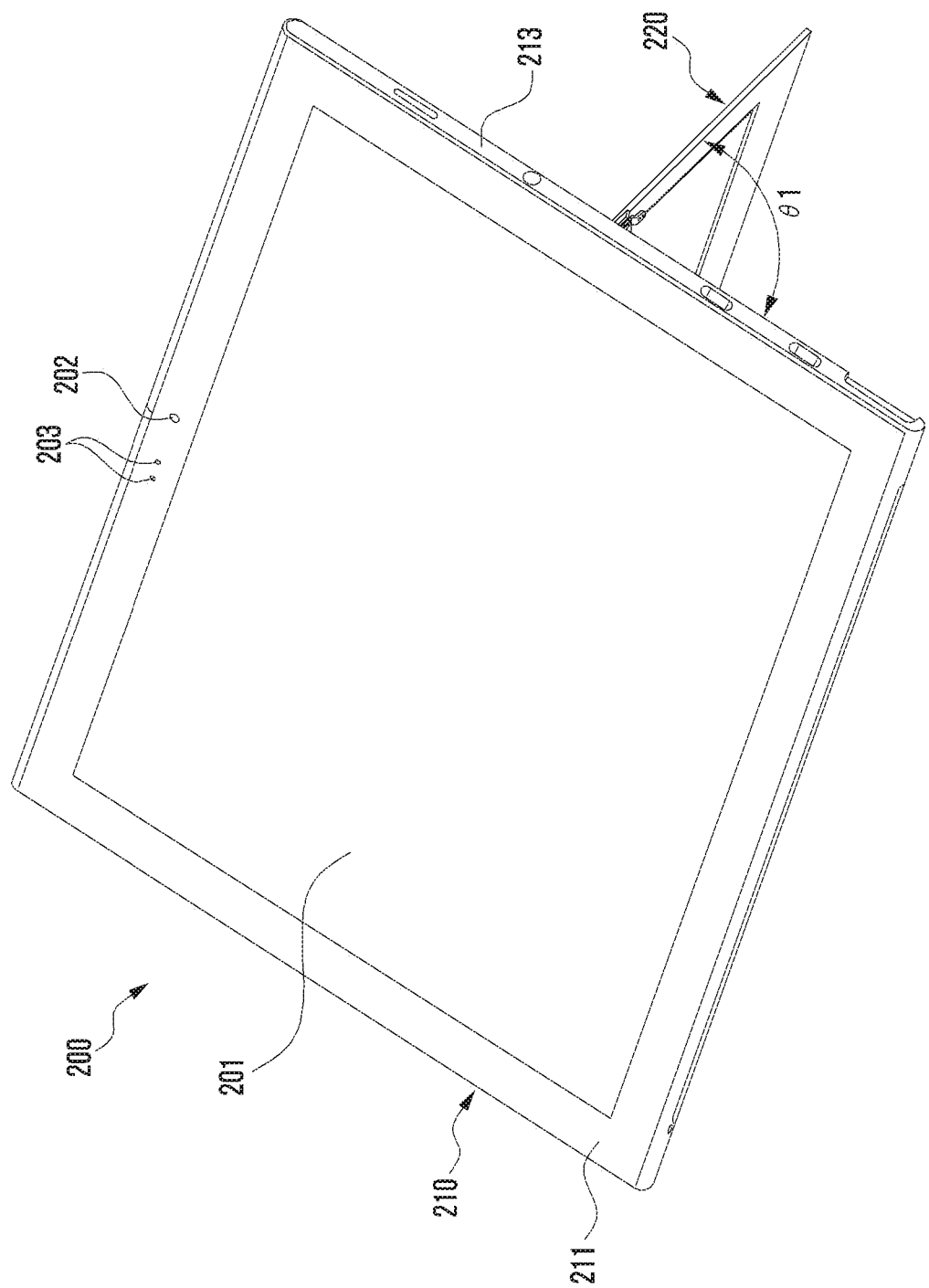
FIGS. 2C and 2D are perspective views showing an unfolded state in which a stand member is unfolded at a first angle from a housing in an electronic device according to various embodiments of the disclosure.
Figure 2D:
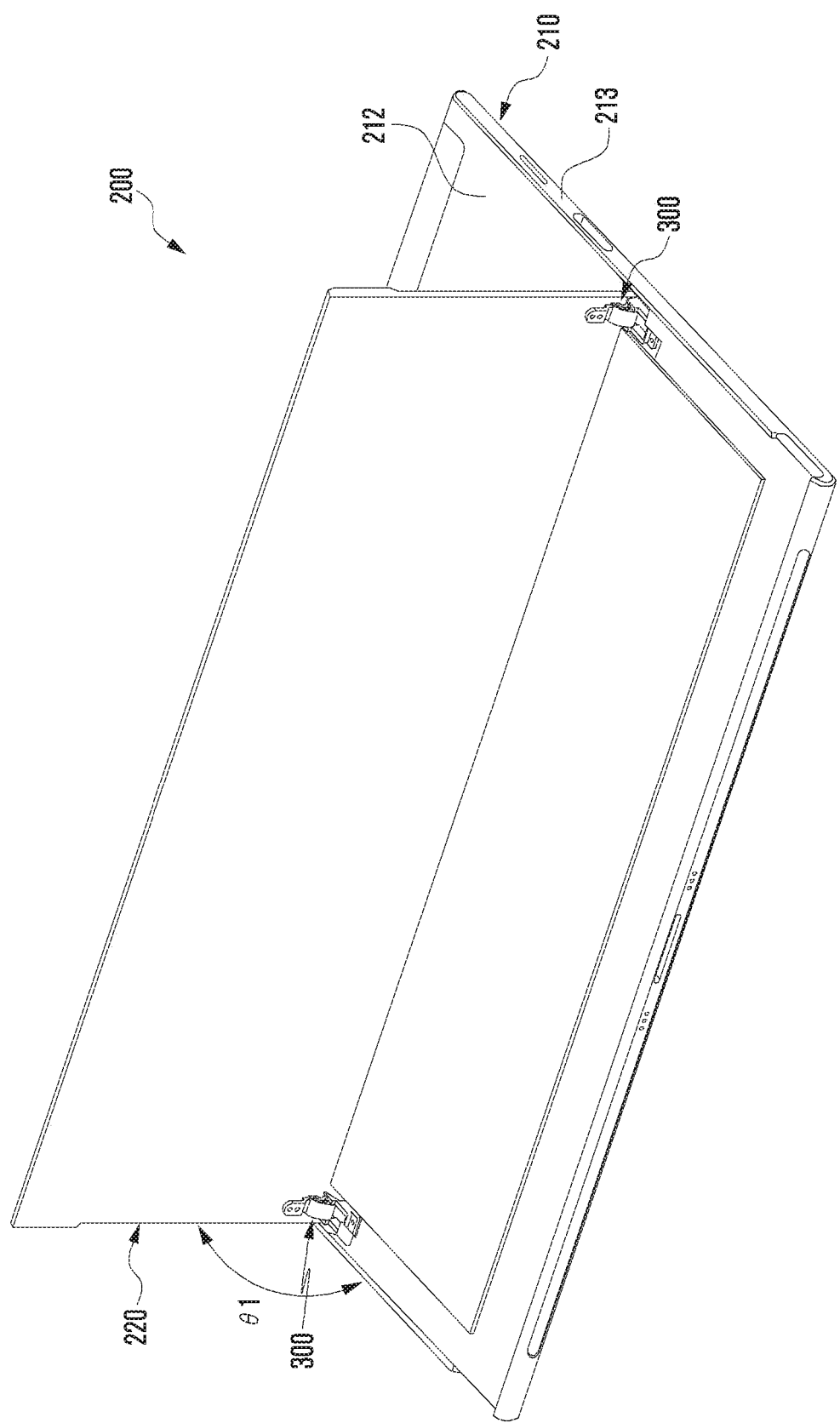
Figure 2E:
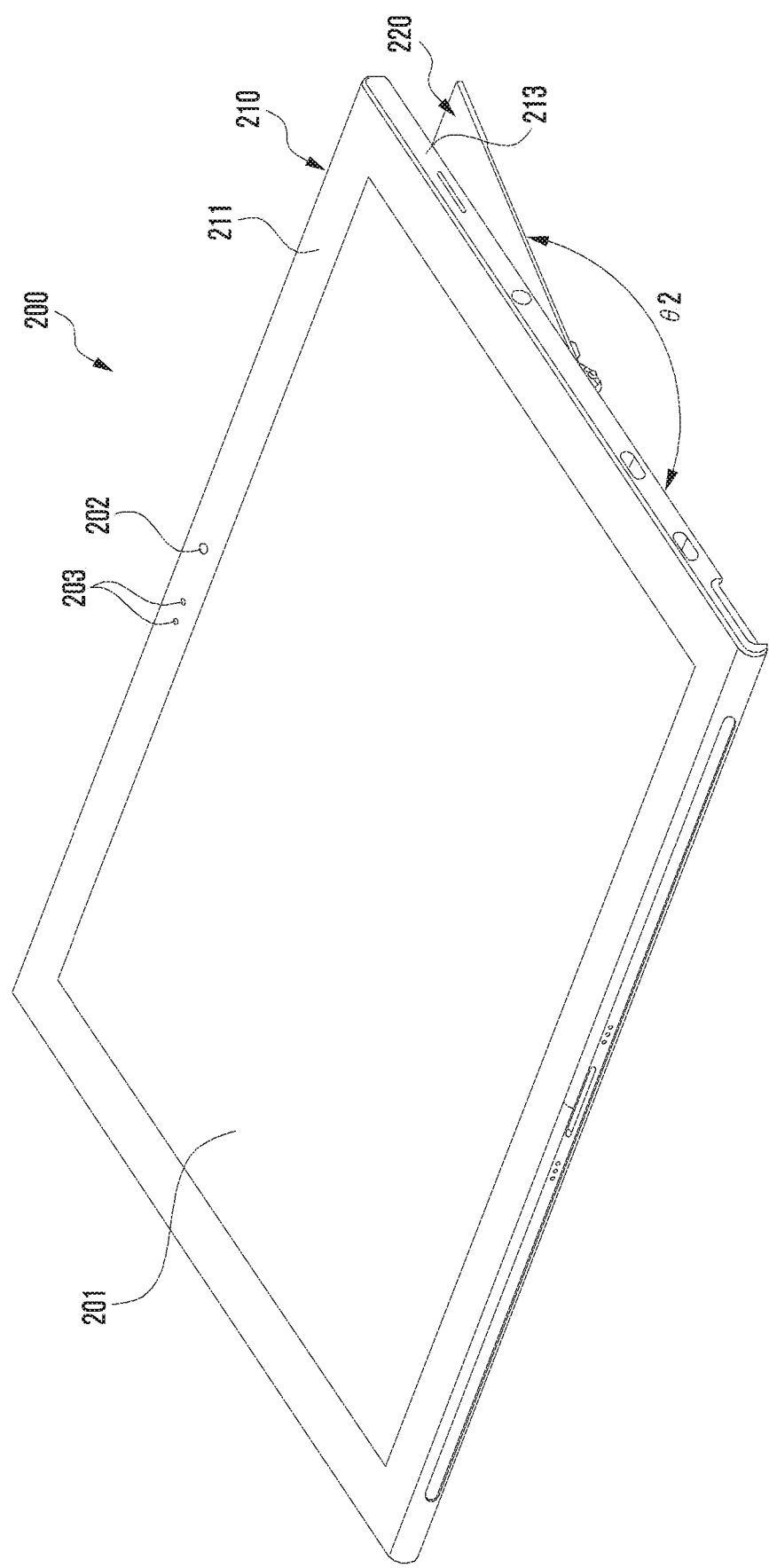
FIGS. 2E and 2F are perspective views showing an unfolded state in which a stand member is unfolded at a second angle from a housing in an electronic device according to various embodiments of the disclosure.
Figure 2F:
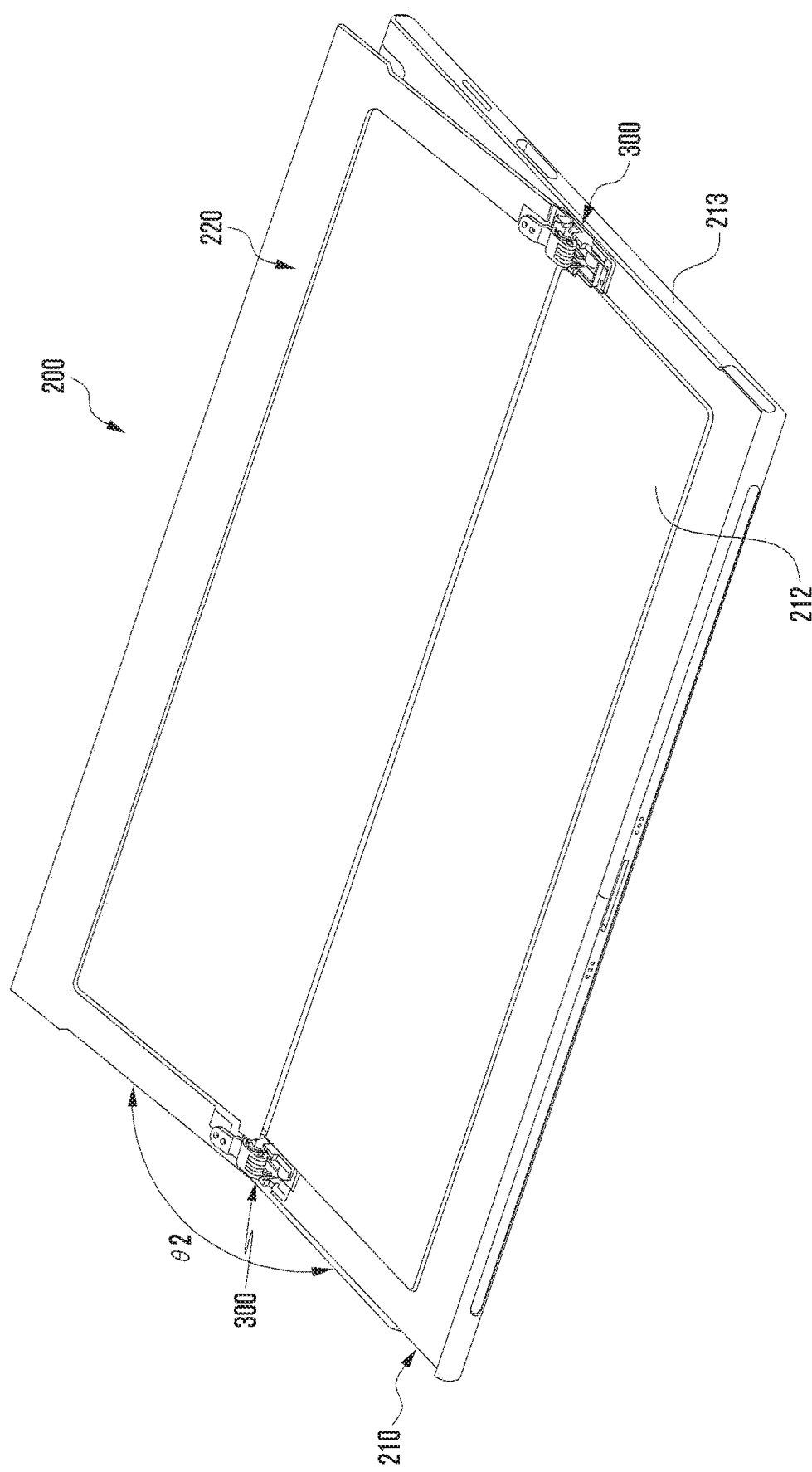

FIGS. 2C and 2D are perspective views showing an unfolded state in which a stand member 220 is unfolded at a first angle (θ1) from a housing 210 in an electronic device 200 according to various embodiments of the disclosure. FIGS. 2E and 2F are perspective views showing an unfolded state in which a stand member 220 is unfolded at a second angle (θ2) from a housing 210 in an electronic device 200 according to various embodiments of the disclosure.

Referring to FIGS. 2C and 2D, the electronic device 200 may include the stand member 220 disposed to be folded to or unfolded from the second plate 212. According to an embodiment, in a fully folded state, the stand member 220 may be disposed to have structurally the same plane with the second plate 212. According to an embodiment, the electronic device 200 may include a hinge structure 300 disposed between the second plate 212 and the stand member 220 to enable the stand member 220 to be folded or unfolded at a certain angle with a torque. According to an embodiment, as shown in FIGS. 2C and 2D, the stand member 220 may be unfolded at the first angle (θ1) (e.g., a range of about 0 to 90 degrees) by a user's manipulation. In another embodiment, as shown in FIGS. 2E and 2F, the stand member 220 may be unfolded at the second angle (θ2) (e.g., a range of about 0 to 170 degrees) by a user's manipulation. In another embodiment, the stand member 220 may be unfolded in a range of about 0 to 180 degrees. In yet another embodiment, the stand member 220 may remain unfolded at various angles desired by the user because a certain torque is generated by the hinge structure 300 during unfolding operation.

According to various embodiments, the hinge structure 300 may be fixed to at least a portion of the second plate 212 and/or the internal space of the electronic device 200 and disposed so as not to be exposed outwardly when the stand member 220 is completely folded to the housing 210. According to an embodiment, the hinge structure 300 may be disposed to be exposed outwardly, at least in part, as the stand member 220 is unfolded from the housing 210.

According to an embodiment, the hinge structure 300 may be disposed at both ends of the second plate 212 in the width direction. In another embodiment, the hinge structure 300 may be disposed at a plurality of points of the second plate 212 on the same widthwise line.

According to various embodiments, the hinge structure 300 is capable of converting a rotational motion of the stand member 220 into a rectilinear motion that generates a torque through at least one link. Therefore, the hinge structure 300 is not worn or damaged even in frequent use, thus improving operational reliability.

Hereinafter, the hinge structure 300 will be described in detail.

Figure 3:
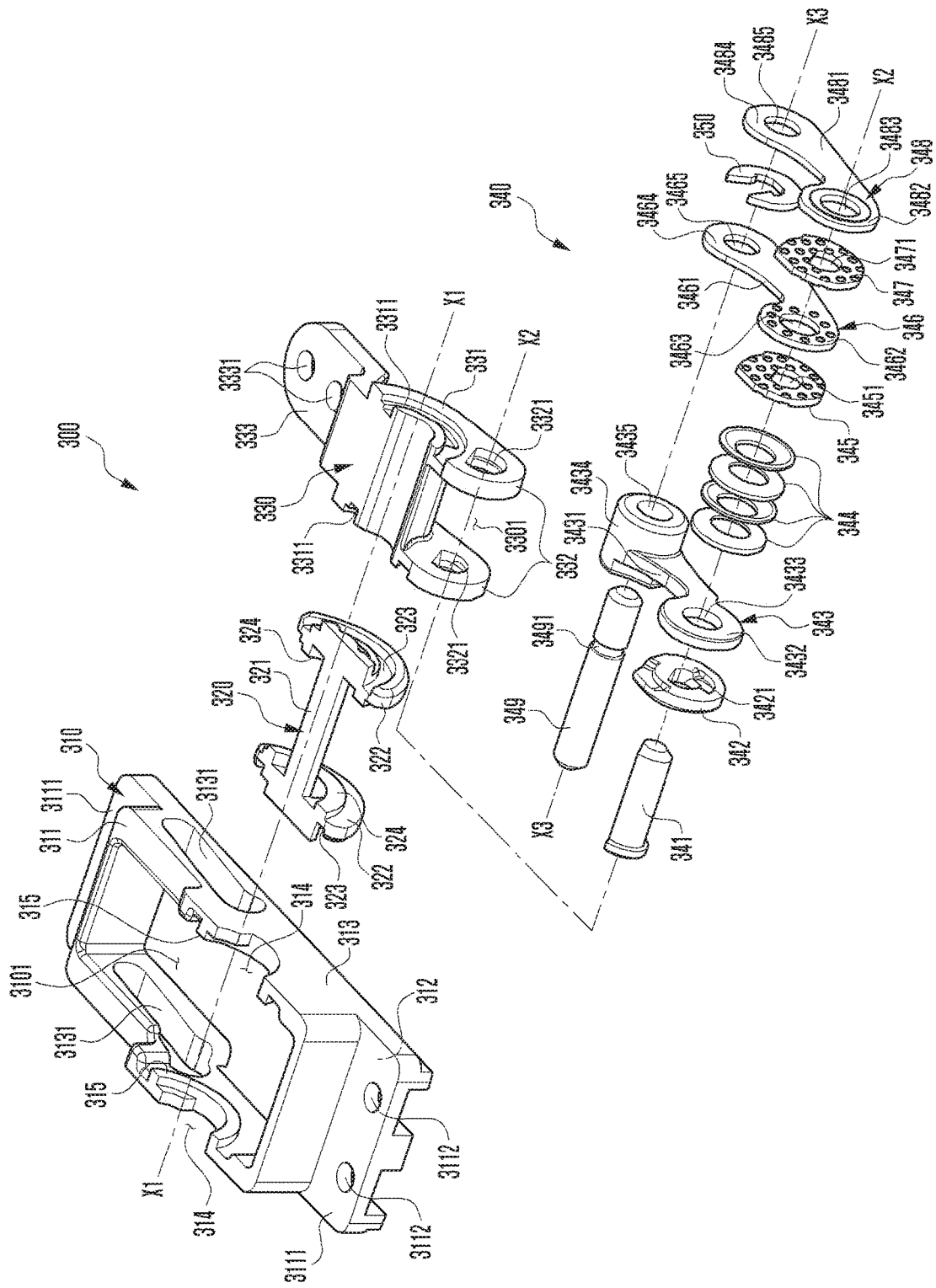
FIG. 3 is an exploded perspective view showing a hinge structure according to various embodiments of the disclosure.

FIG. 3 is an exploded perspective view showing a hinge structure 300 according to various embodiments of the disclosure.

According to an embodiment, all components of the hinge structure 300 may be formed of a metallic material. In another embodiments, at least some components of the hinge structure 300 may be formed of a metallic material, and the others may be formed of a polymer.

Referring to FIG. 3, the hinge structure 300 may include a base member 310 disposed on the second plate (e.g., 212 in FIG. 2D), a first rotatable member 320 (e.g., a center bracket) rotatably disposed on the base member 310, a second rotatable member 330 (e.g., a mounting bracket) rotatably disposed on the first rotatable member 320, and a torque generating structure 340 disposed on the second rotatable member 330.

According to various embodiments, the hinge structure 300 may include the base member 310 disposed in at least a portion of the second plate (e.g., 212 in FIG. 2D) of the electronic device (e.g., 200 in FIG. 2D). According to an embodiment, the base member 310 may include a first surface 311 facing the same direction as the direction of the second plate (e.g., 212 in FIG. 2D), a second surface 312 facing the direction opposite to the direction of the first surface 311, and sidewalls 313 surrounding a space between the first surface 311 and the second surface 312. According to an embodiment, the base member 310 may include an internal space 3101 penetrating from the first surface 311 to the second surface 312 and accommodating the first rotatable member 320, the second rotatable member 330, and the torque generating structure 340. According to an embodiment, the base member 310 may include a pair of flanges 3111 extended from opposite ends of the internal space 3101 and each having a plurality of screw holes 3112 for receiving screws to be fixed to the second plate (e.g., 212 in FIG. 2D). According to an embodiment, the base member 310 may include a pair of recesses 314 formed in the opposite sidewalls 313 to have a certain depth from the first surface 311 toward the second surface 312 and thereby rotatably receive the first rotatable member 320. According to an embodiment, the recess 314 may be formed in a curved shape (e.g., semicircular shape) to allow the rotation of the first rotatable member 320. According to an embodiment, the base member 310 may include a pair of first guide protrusions 315 each protruding from the sidewall 313 into the internal space 3101 along an edge of the recess 314. According to an embodiment, the first guide protrusion 315 is placed in a first guide groove 323 formed in the first rotatable member 320, thereby allowing the rotation of the first rotatable member 320. According to an embodiment, the base member 310 may include a pair of guide holes 3131 each formed in the sidewall 313 near the recess 314 to have a certain horizontal length. According to an embodiment, the guide hole 3131 may be formed to penetrate the sidewall 313 in the horizontal direction to expose the internal space 3101.

According to various embodiments, the hinge structure 300 may include the first rotatable member 320 that is rotatably accommodated in the internal space 3101 of the base member 310. According to an embodiment, the first rotatable member 320 may include a connecting rod 321 having a predetermined length and a pair of first rotatable portions 322 which are vertically extended from both ends of the connecting rod 321 and rotatably placed in the recesses 314 of the base member 310. Thus, the first rotatable portion 322 has a shape corresponding to the recess 314. According to an embodiment, the first rotatable portion 322 may be formed in a curved shape (e.g., semicircular shape) corresponding to the recess 314. According to an embodiment, the first rotatable portion 322 may include a first guide groove 323 formed on the outer surface to receive the first guide protrusion 315 of the base member 310. According to an embodiment, the first rotatable portion 322 may include a second guide protrusion 324 formed on the inner surface to be placed in a second guide groove 3311 of the second rotatable member 330. According to an embodiment, the hinge structure 300 may include a stopper structure that restricts the rotation of the first rotatable member 320 within a certain angle in the recess 314 of the base member 310.

According to various embodiments, the hinge structure 300 may include the second rotatable member 330 that is rotatably coupled to the first rotatable member 320. According to an embodiment, the second rotatable member 330 may include a second rotatable portion 331 interposed between the pair of first rotatable portions 322 of the first rotatable member 320. According to an embodiment, the second rotatable member 330 may include a pair of hinge arms 332 extended from one side of the second rotatable portion 331 and spaced apart to form a space 3301 for receiving the torque generating structure 340. According to an embodiment, each hinge arm 332 may have a shaft hole 3321 into which a rotating shaft 341 of the torque generating structure 340 is inserted. According to an embodiment, the second rotatable member 330 may include a fixing pad 333 extended from the other side of the second rotatable portion 331 and fixed to at least a part of the stand member (e.g., 220 in FIG. 2D). According to an embodiment, the fixing pad 333 may have at least one screw hole 3331 for screw fastening with the stand member (e.g., 220 in FIG. 2D). According to an embodiment, the second rotatable member 330 may include a pair of second guide grooves 3311 formed on both ends of the second rotatable portion 331 to receive the second guide protrusions 324 of the first rotatable member 320. According to an embodiment, the second rotatable portion 331 may be formed in a curved shape (e.g., semicircular shape) so as to be rotatable with respect to the first rotatable portion 322.

According to various embodiments, when the first rotatable member 320 is rotatably disposed in the base member 310, and when the second rotatable member 330 is rotatable coupled to the first rotatable member 320, the first rotatable member 320 and/or the second rotatable member 330 in the hinge structure 300 may be rotated about a first axis (X1) located near the base member 310. For example, the first axis (X1) may be located outside the hinge structure 300.

According to various embodiments, the hinge structure 300 may include the torque generating structure 340 that provides a torque to the stand member (e.g., 220 in FIG. 2D) in accordance with the rotation of the first rotatable member 320 and/or the second rotatable member 330 from the base member 310. According to an embodiment, the torque generating structure 340 may be disposed between the pair of hinge arms 332 of the second rotatable member 330 to be rotatable about a second axis (X2) that substantially coincides with the shaft hole 3321.

According to various embodiments, the torque generating structure 340 may include the rotating shaft 341 inserted into the shaft holes 3321 formed in the pair of hinge arms 332. According to an embodiment, the torque generating structure 340 may further include a cam washer 342, a cam link 343, at least one spring 344, a first washer 345, a first link 346, a second washer 347, and a second link 348, which are sequentially disposed in the space 3301 between the pair of hinge arms 332 and have similar holes for receiving the rotating shaft 341.

According to various embodiments, one portion of each of the cam link 343, the first link 346, and the second link 348 is rotatably arranged with respect to the second axis (X2), and another portion has another hole for receiving a guide shaft 349 which performs a rectilinear motion along the guide hole 3131 of the base member 310. According to an embodiment, the cam link 343 may have a connecting rod 3431 having a predetermined length, a cam disc 3432 extended from one end of the connecting rod 3431 and being, at least partly, in surface contact with the cam washer 342, and a guide stub 3434 extended from the other end of the connecting rod 3431. According to an embodiment, the first link 346 may have a first connecting paddle 3461 of a predetermined length, a first disc 3462 extended from one end of the first connecting paddle 3461 and being in surface contact with the first and second washers 345 and 347, and a first guide pad 3464 extended from the other end of the first connecting paddle 3461. According to an embodiment, the second link 348 may have a second connecting paddle 3481 of a predetermined length, a second disc 3482 extended from one end of the second connecting paddle 3481 and being in surface contact with the second washer 347, and a second guide pad 3484 extended from the other end of the second connecting paddle 3481. According to an embodiment, the guide stub 3434, the first guide pad 3464, and the second guide pad 3484 may have shaft holes 3435, 3465, and 3485, respectively, for receiving the guide shaft 349 disposed on a third axis (X3). According to an embodiment, an E-ring 350 may be interposed between the first and second guide pads 3464 and 3484 and fixed to a fixing groove 3491 on the guide shaft 349 in order to maintain a gap between the first and second links 346 and 348.

According to various embodiments, the rotating shaft 341 may have a cross-sectional shape (e.g., D-cut shape) corresponding to the shaft hole 3321 of the hinge arm 332 in order to rotate together in accordance with the rotation of the second rotatable member 330. For simultaneous rotation with the second rotatable member 330, the rotating shaft 341 may be formed in various shapes other than a circular shape. Therefore, when the second rotatable member 330 is rotated via the first rotatable member 320 in the base member 310, the second axis (X2) may be rotated autonomously while being moved, and this rotation of the second axis (X2) may induce the rotation of the rotating shaft 341. According to an embodiment, the cam washer 342, the first washer 345, and the second washer 347 may have holes 3421, 3451, and 3471, respectively, each formed in a corresponding shape for allowing the simultaneous rotation with the rotating shaft 341. Therefore, when the rotating shaft 341 is rotated in accordance with the rotation of the second rotatable member 330, all of the cam washer 342, the first washer 345, and the second washer 347 may be rotated together about the second axis (X2). According to an embodiment, the cam disc 3432 of the cam link 343, the spring 344, the first disc 3462 of the first link 346, and the second disc 3482 of the second link 348 may have holes 3433, 3463, and 3483, respectively, each formed in a certain shape (e.g., a circle including D-cutting) for allowing a rotation when the rotating shaft 341 is rotated. That is, although the rotating shaft 341 is rotated, the cam disc 3432 of the cam link 343, the spring 344, the first disc 3462 of the first link 346, and the second disc 3482 of the second link 348 might not be rotated with their positions maintained.

Hereinafter, coupling and operating relations of the hinge structure 300 will be described in detail.

Figure 4A:
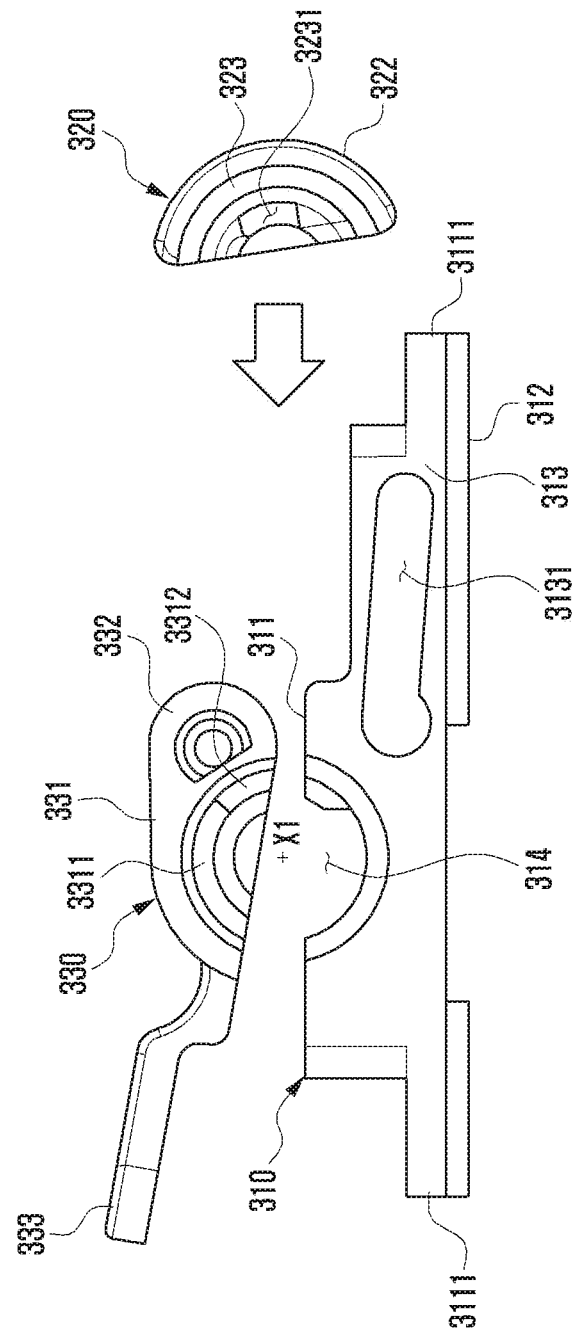
FIGS. 4A and 4B are views showing a state in which a first rotatable member and a second rotatable member are operatively coupled to a base member according to various embodiments of the disclosure.
Figure 4B:
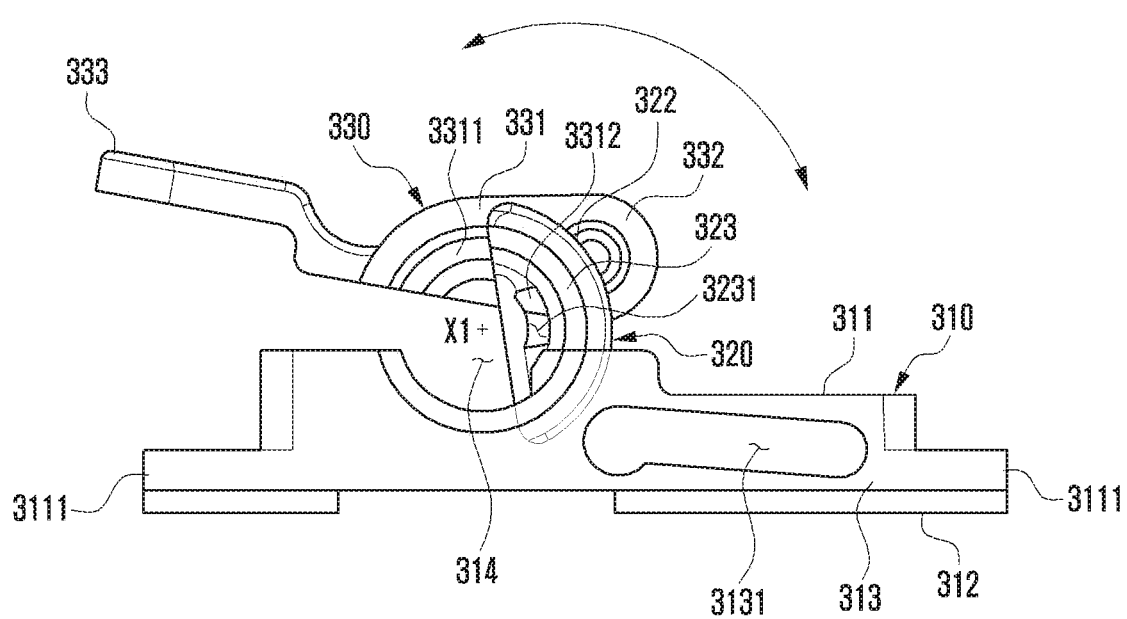

FIGS. 4A and 4B are views showing a state in which a first rotatable member 320 and a second rotatable member 330 are operatively coupled to a base member 310 according to various embodiments of the disclosure.

Referring to FIGS. 4A and 4B, the hinge structure (e.g., 300 in FIG. 3) may include the base member 310, the first rotatable member 320 rotatably coupled to the base member 310, and the second rotatable member 330 rotatably coupled to the first rotatable member 320.

According to various embodiments, the first rotatable member 320 may be disposed such that the first rotatable portion 322 is placed in the recess 314 of the base member 310. In this case, the first rotatable member 320 may be rotated about the first axis (X) with respect to the base member 310 as the first guide protrusion (e.g., 315 in FIG. 3) of the base member 310 is guided along the first guide groove 323 of the first rotatable portion 322. According to an embodiment, the second rotatable member 330 may be disposed rotatably with the first rotatable member 320. In this case, the second rotatable member 330 may be rotated about the first axis (X1) as the second guide protrusion (e.g., 324 in FIG. 3) of the first rotatable portion 322 is guided along the second guide groove 3311 of the second rotatable portion 331.

According to various embodiments, the hinge structure (e.g., 300 in FIG. 3) may include a stopping structure for further rotating the first rotatable member 320 after the second rotatable member 330 is rotated at a predetermined angle from the base member 310. According to an embodiment, the stopping structure may include a latching groove 3231 formed in the first rotatable portion 322 of the first rotatable member 320 and a latching protrusion 3312 formed in the second rotatable portion 331 of the second rotatable member 330 to selectively engage with the latching groove 3231. For example, in a state where the first and second rotatable members 320 and 330 are rotatably disposed on the base member 310, the second rotatable member 330 is rotated at a predetermined angle about the first axis (X1), and thereby the latching protrusion 3312 of the second rotatable member 330 is engaged with the latching groove 3231 of the first rotatable member 320. This allows the first rotatable member 320 to be further rotated together with the second rotatable member 330 with respect to the first axis (X1). Although not shown, an additional stopper structure for stopping the rotation of the first rotatable member 320 may be provided between the first rotatable member 320 and the base member 310 in order to determine a rotation angle (e.g., a final opening angle) between the first and second rotatable members 320 and 330. Although not shown, the additional stopper structure may also include latching members such as the latching protrusion 3312 and the latching groove 3231 which interfere with each other when the first rotatable member 320 is rotated at a certain angle.

Figure 5A:
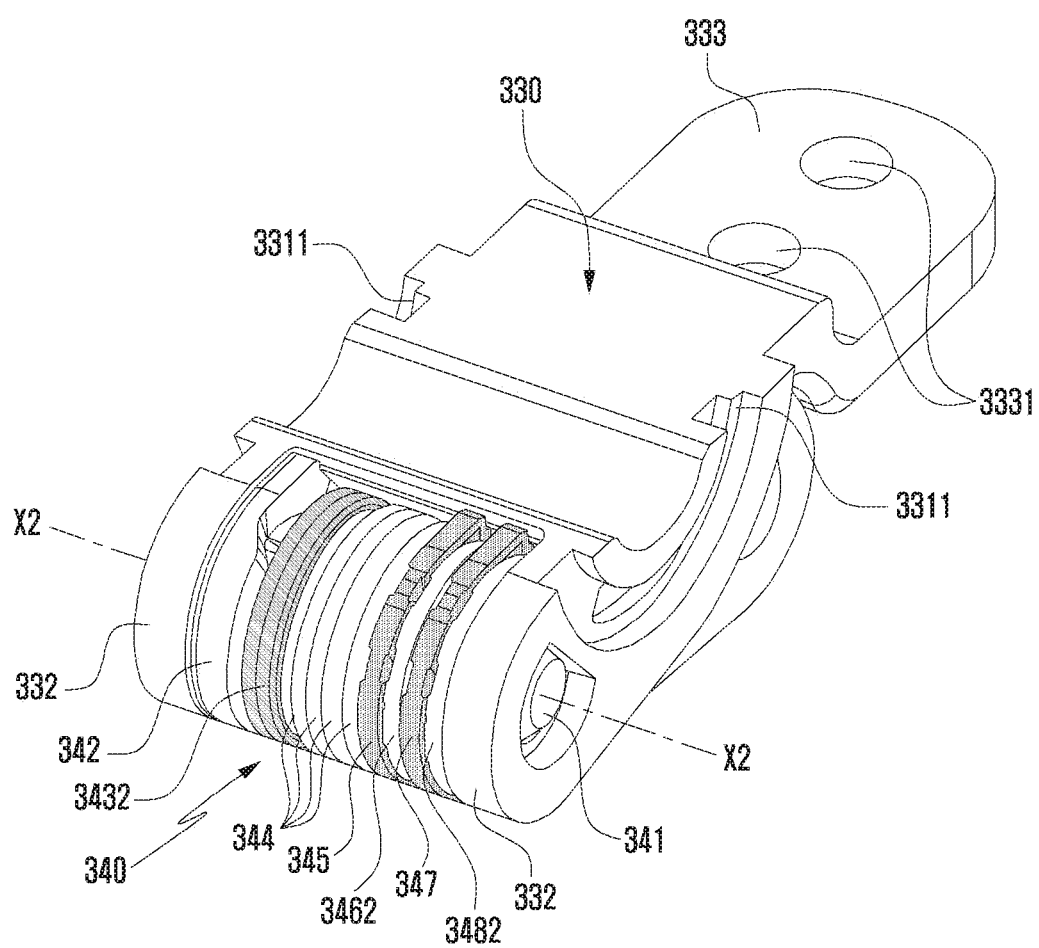
FIGS. 5A, 5B, and 5C are views showing a state in which a torque generating structure of a hinge structure is coupled to a second rotatable member according to various embodiments of the disclosure.
Figure 5B:
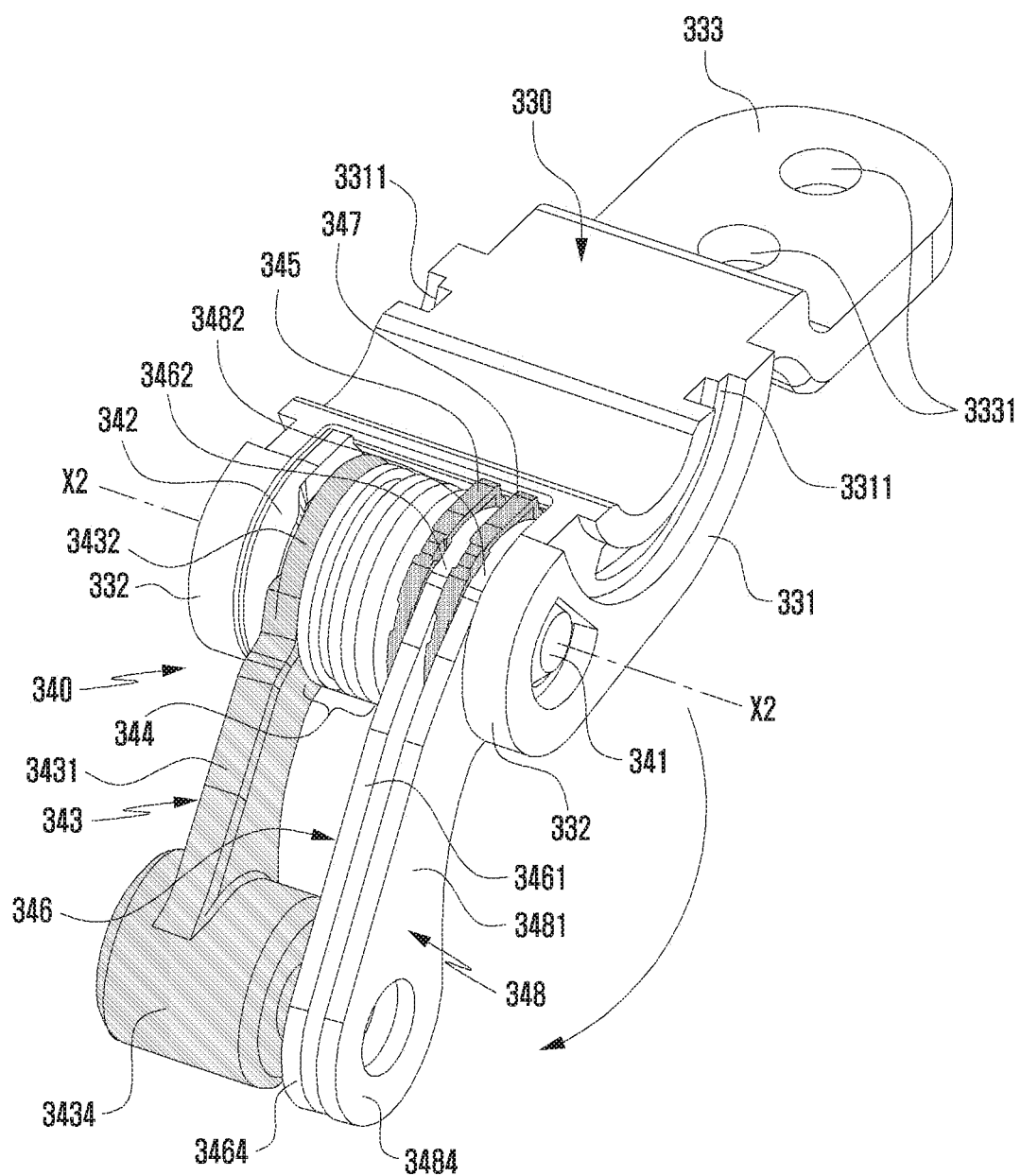
Figure 5C:
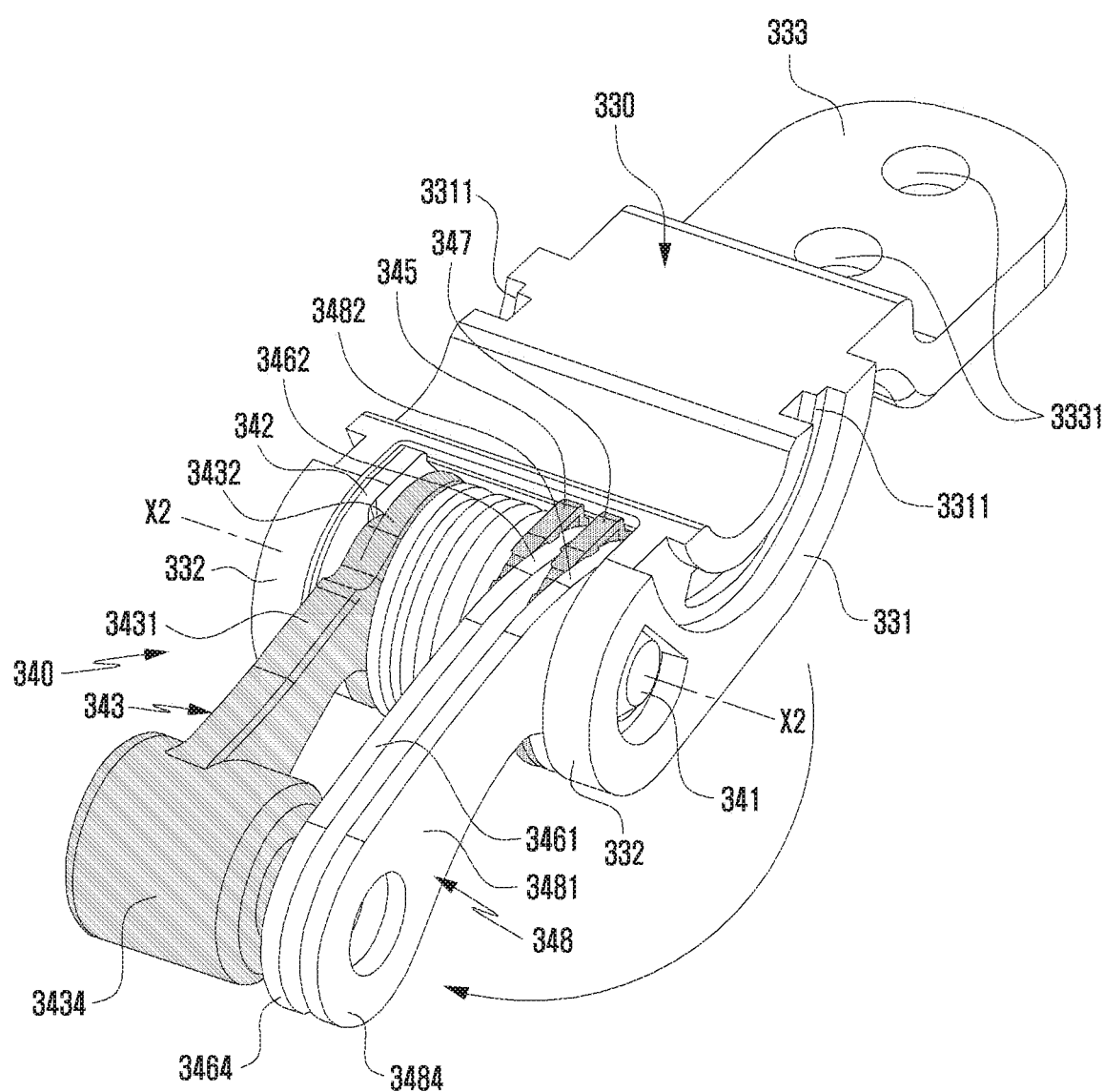

FIGS. 5A, 5B and 5C are views showing a state in which a torque generating structure of a hinge structure is coupled to a second rotatable member according to various embodiments of the disclosure. FIGS. 5A, 5B and 5C also show the operation sequence when the second rotatable member is rotated from the base member.

Referring to FIGS. 5A, 5B and 5C, as described above, the torque generating structure 340 may include the cam washer 342, the cam link 343, the at least one spring 344, the first washer 345, the first link 346, the second washer 347, and the second link 348, which are sequentially disposed in the space (e.g., 3301 in FIG. 3) between the pair of hinge arms 332 and commonly engaged with the rotating shaft 341 inserted into the shaft holes 3321 formed in the pair of hinge arms 332. According to an embodiment, the at least one spring 344 may include a plurality of disc springs arranged to face each other so as to provide a pressing force in a direction parallel to the second axis (X2). In another embodiment, the at least one spring 344 may include a plurality of compressive coil springs or leaf springs disposed to receive the rotating shaft 341 so as to provide a pressing force in a direction parallel to the second axis (X2). According to an embodiment, one portion of each of the cam link 343, the first link 346, and the second link 348 may be rotatably disposed with respect to the second axis (X2).

According to various embodiments, when the torque generating structure 340 is completely assemble, the cam disc 3432 is capable of moving along the second axis (X2) toward the spring 344 through a cam engagement structure of the cam washer 342 and the cam disc 3432 of the cam link 343. When the cam disc 3432 moves, the spring 344 is pressed toward the first washer 345. Through this pressing force, a surface pressure is applied to the first washer 345 and the first disc 3462 of the first link 346. In addition, through the pressing force of the spring 344, a surface pressure is further applied to the second washer 347 and the second disc 3482 of the second link 348. When the second rotatable member 330 is rotated, these surface pressures may generate a certain torque. At this time, the cam link 343, the first link 346, and the second link 348 may be rotated with respect to the rotating shaft 341. This rotation may induce the guide shaft (e.g., 349 in FIG. 3), which is coupled to the cam link 343, the first link 346, and the second link 348, to perform a rectilinear motion along the guide hole (e.g., 3131 in FIG. 3) of the base member (e.g., 310 in FIG. 3).

According to various embodiments, at least one dimple for holding lubricant (e.g., grease) may be formed on surfaces of the first washer 345 and the first disc 3462 to which the surface pressure is applied. This allows providing a uniform torque to the second rotatable member 330 and also realizing a smooth motion. In addition, such a dimple may be further formed on surfaces of the second washer 347 and the second disc 3482 to which the surface pressure is applied.

Although the second washer 347 and the second link 348 having the second disc 3482 are further provided for an additional surface pressure, they may be omitted depending on a required torque.

Figure 6A:
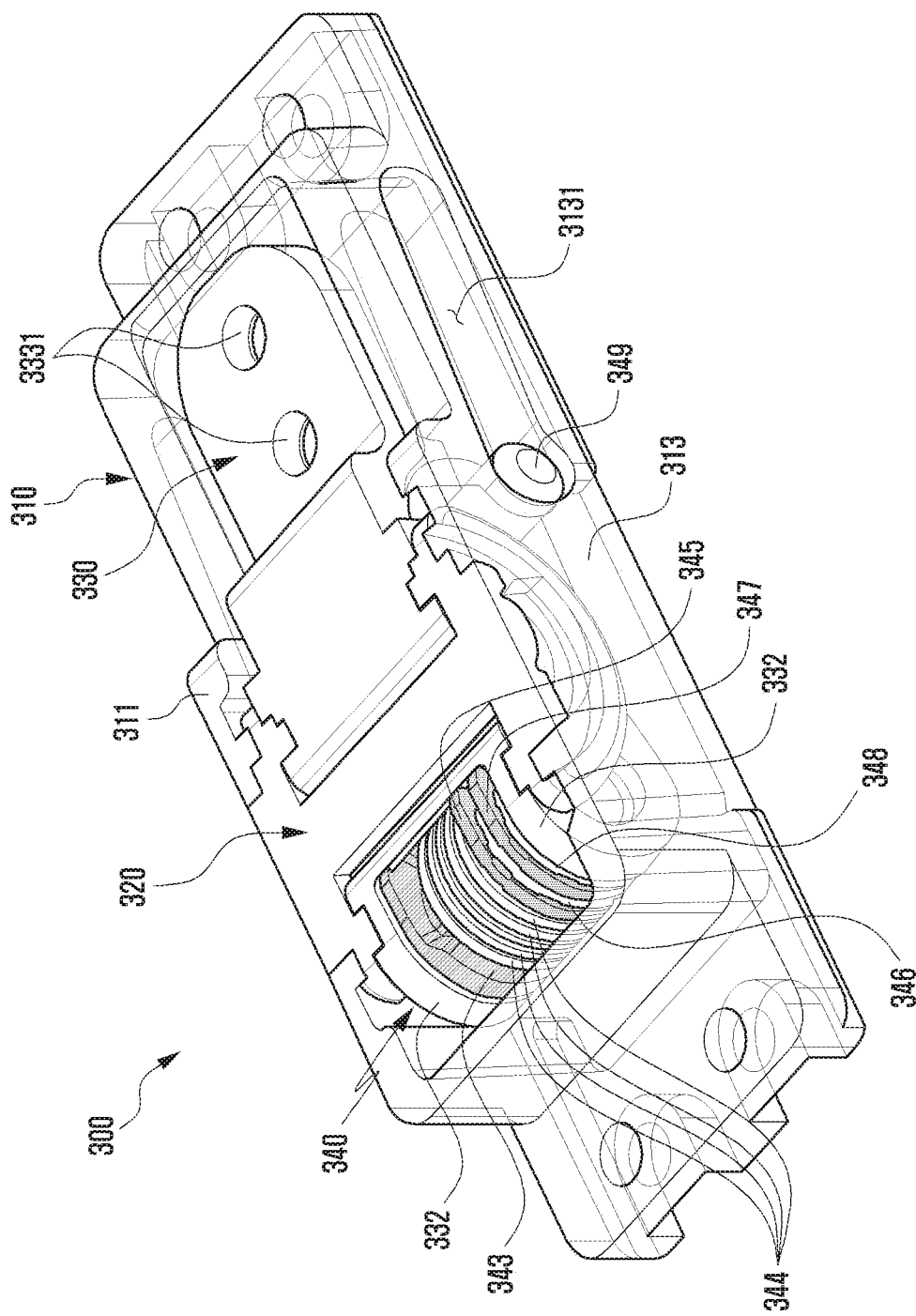
FIG. 6A is a perspective view showing a combined state of a hinge structure according to various embodiments of the disclosure.
Figure 6B:
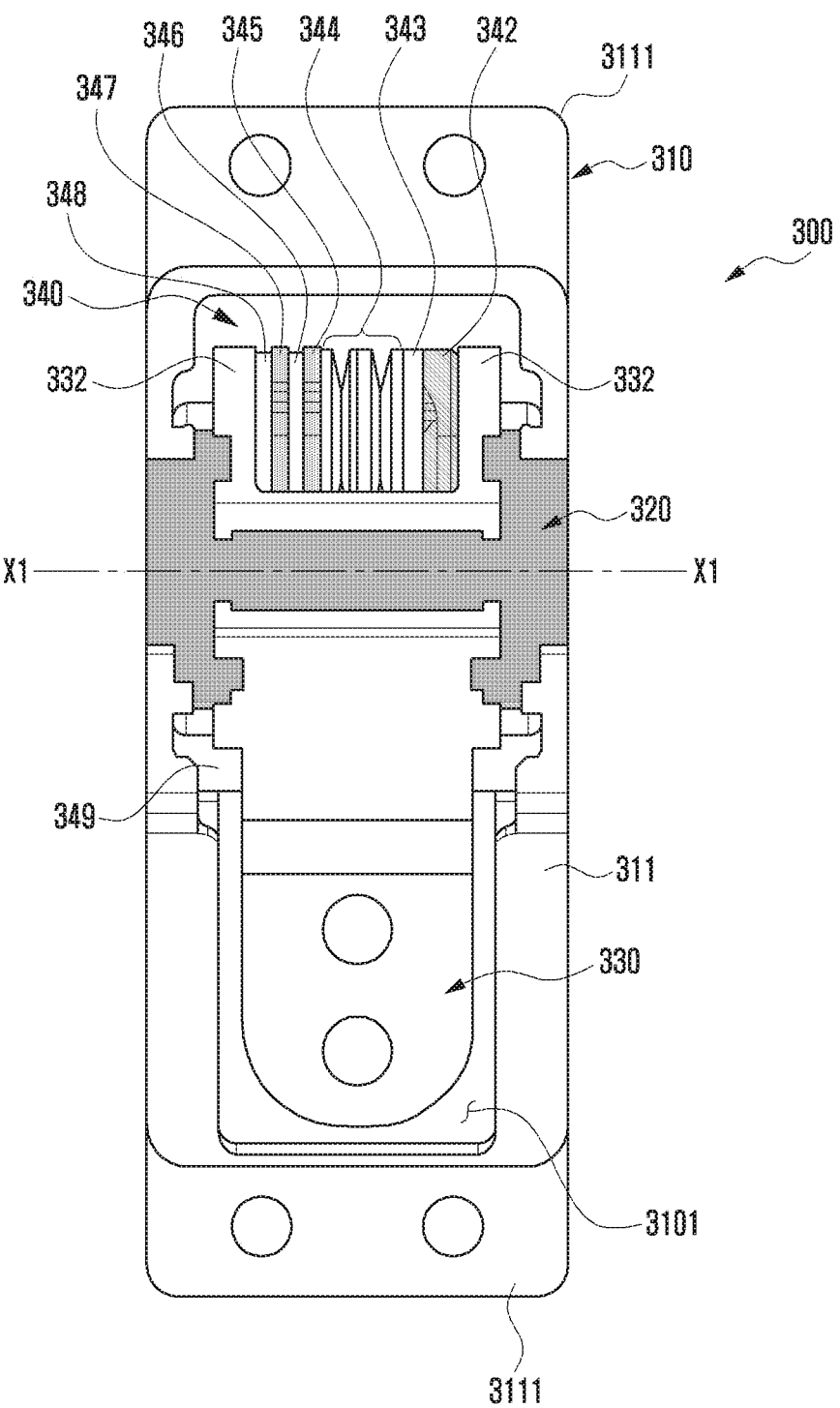
FIG. 6B is a plan view of the hinge structure shown in FIG. 6A according to various embodiments of the disclosure.
Figure 6C:
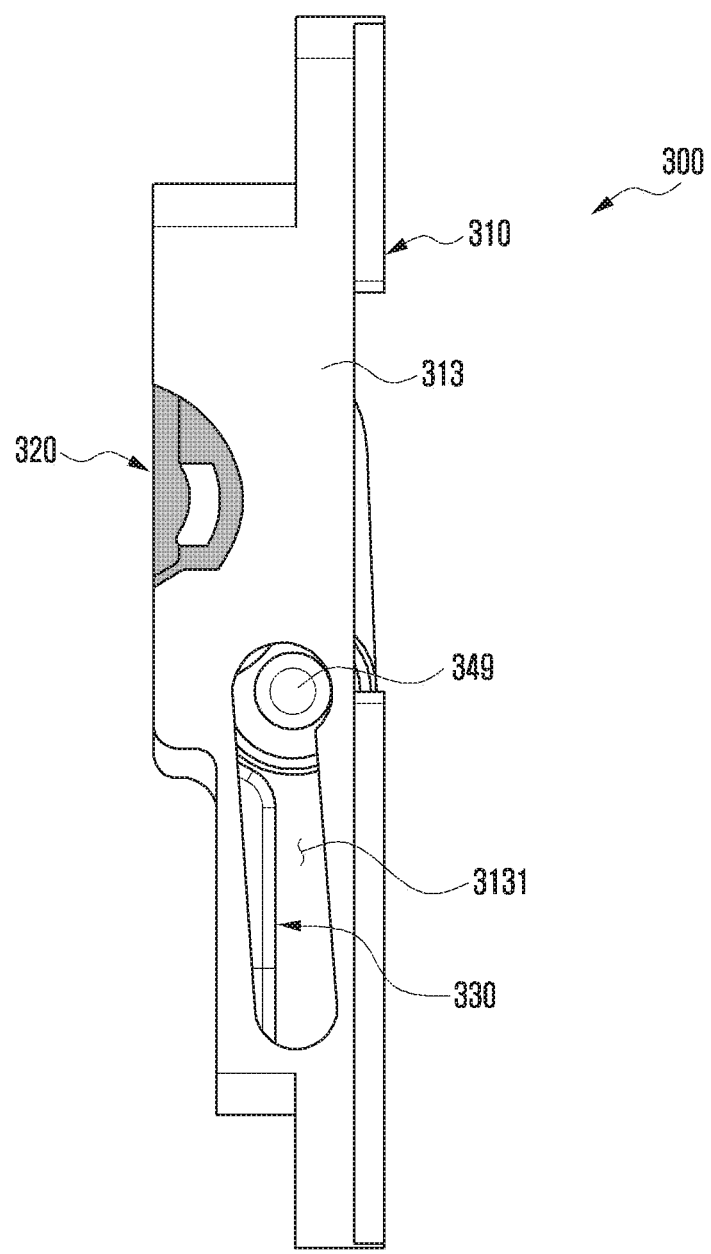
FIG. 6C is a side view of the hinge structure shown in FIG. 6A according to various embodiments of the disclosure.
Figure 6D:
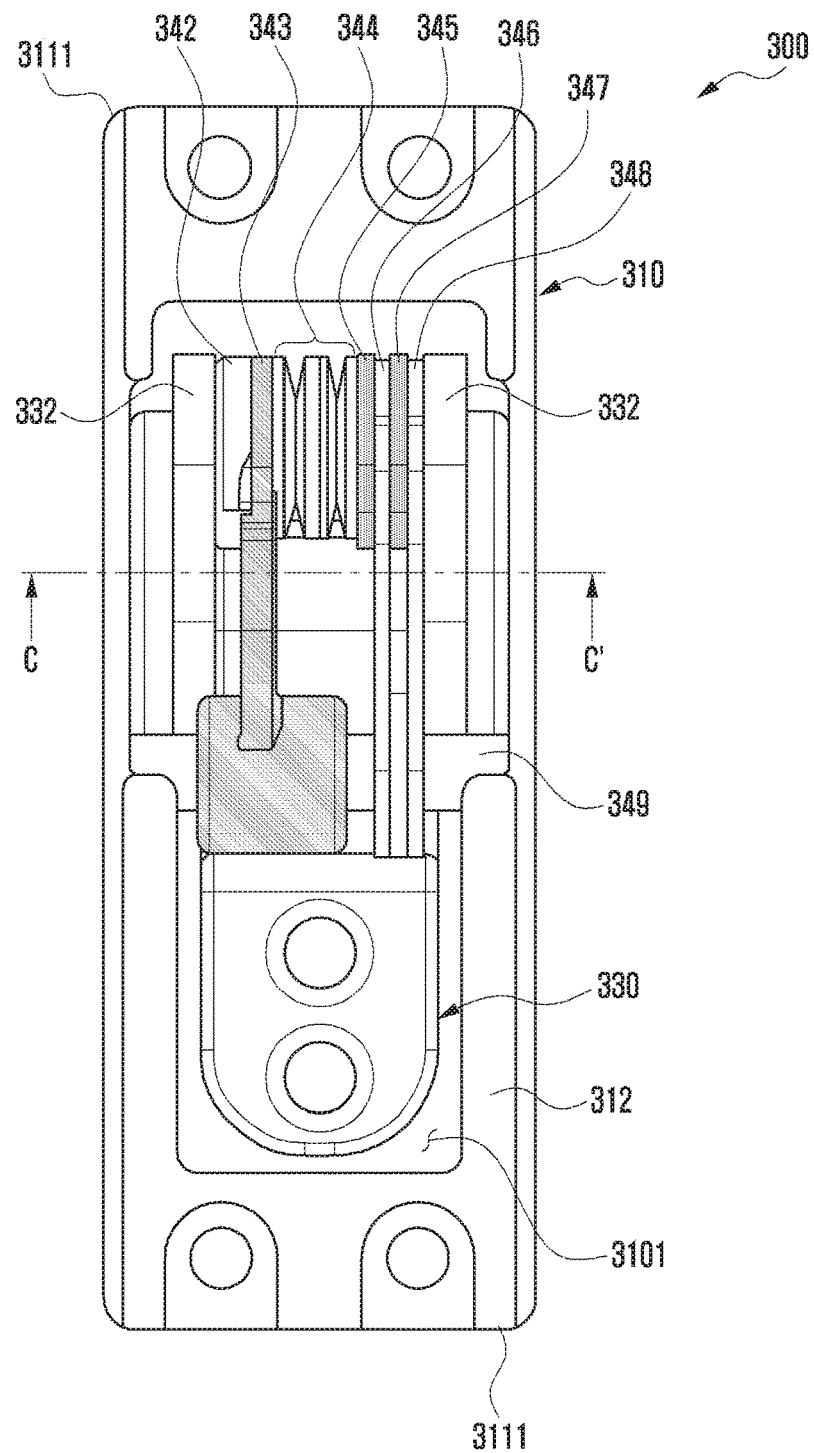
FIG. 6D is a bottom view of the hinge structure shown in FIG. 6A according to various embodiments of the disclosure.

FIG. 6A is a perspective view showing a combined state of a hinge structure 300 according to various embodiments of the disclosure. FIG. 6B is a plan view of the hinge structure 300 shown in FIG. 6A. FIG. 6C is a side view of the hinge structure 300 shown in FIG. 6A. FIG. 6D is a bottom view of the hinge structure 300 shown in FIG. 6A.

Referring to FIGS. 6A, 6B, 6C and 6D, as described above, the hinge structure 300 may include the base member 310, the first rotatable member 320 rotatably disposed in the internal space 3101 of the base member 310, the second rotatable member 330 rotatably disposed on the first rotatable member 320, and the torque generating structure 340 disposed on one end of the second rotatable member 330. According to an embodiment, in the initial state of the hinge structure 300 (i.e., in a state where the stand member is fully folded to the housing), the first rotatable member 320, the second rotatable member 330, and the torque generating structure 340 may be disposed so as not to be protruded from the first surface 311 of the base member 310. Therefore, when the hinge structure 300 is assembled to the second plate (e.g., 212 in FIG. 2D) of the housing, and the stand member (e.g., 220 in FIG. 2D) is fixed to the fixing pad 333 of the second rotatable member 330 exposed in a direction where the first surface 311 of the base member 310 faces, the stand member (e.g., 220 in FIG. 2D) and the second plate (e.g., 212 in FIG. 2D) may have the same plane.

According to various embodiments, the first rotatable member 320 may be rotatably coupled to the base member 310, and the second rotatable member 330 may be rotatably coupled to the first rotatable member 320. According to an embodiment, when the hinge structure is completely assembled, the guide shaft 349 capable of the rotation by engaging with the cam link 343, the first link 346, and the second link 348 of the torque generating structure 340 may be, at both ends thereof, disposed in and guided along the guide holes 3131 of the base member 310. Therefore, the torque generating structure 340 is capable of primarily generating a torque in accordance with the rotation of the second rotatable member 330. Then, because the guide shaft 349 is induced to perform a rectilinear motion by the guide holes 3131 that restrict the escape of the guide shaft 349, the torque generating structure 340 is capable of secondarily generating a torque. That is, when the second rotatable member 330 is rotated by an external force, the guide shaft 349 cannot perform a rotational motion by the guide hole 3131 and can instead perform a rectilinear motion. Thus, an interaction between the rotational motion of the second rotatable member 330 and the rectilinear motion of the guide shaft 349 enables the cam link 343 and the other links 346 and 348 to be rotated about the second axis (X2), so that this rotation produces a torque through the internal structure.

Figure 6E:
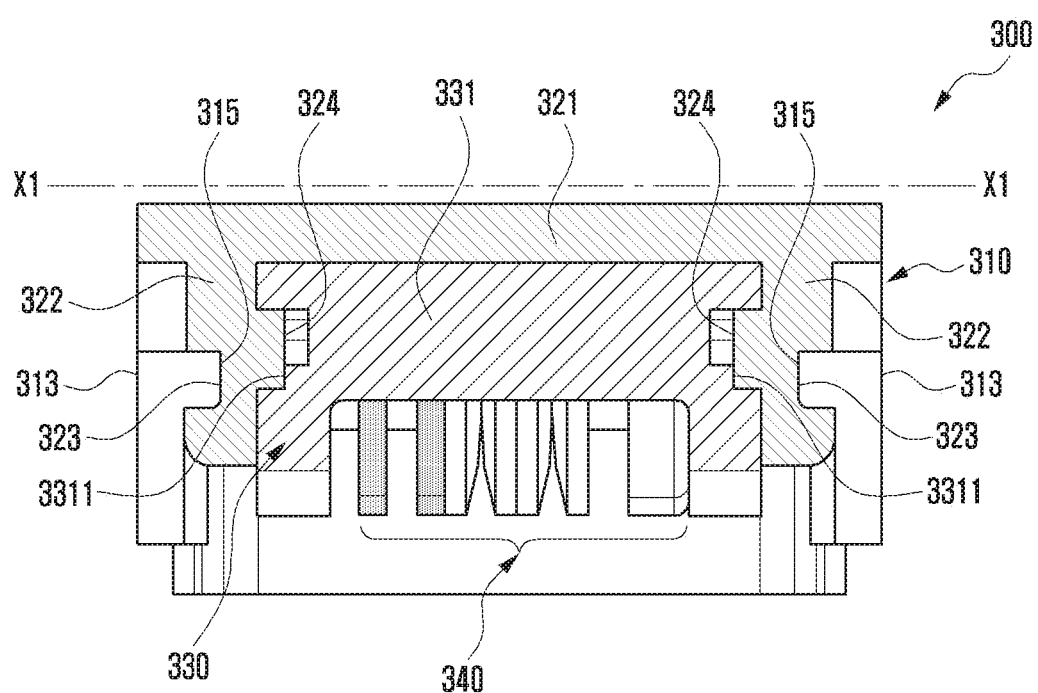
FIG. 6E is a cross-sectional view of the hinge structure taken along the line C-C' of FIG. 6D according to various embodiments of the disclosure.

FIG. 6E is a cross-sectional view of the hinge structure 300 taken along the line C-C' of FIG. 6D. Specifically, FIG. 6E shows a mutual guide structure among the base member 310, the first rotatable member 320, and the second rotatable member 330.

Referring to FIG. 6E, the first rotatable member 320 may be disposed such that the first rotatable portion 322 is placed in the recess (e.g., 314 in FIG. 3) of the base member 310. In this case, the first guide protrusion 315 formed in the base member 310 is guided along the first guide groove 323 formed in the first rotatable portion 322, so that the first rotatable member 320 is disposed in the base member 310 to be rotatable about the first axis (X1). According to an embodiment, the second rotatable member 330 may be rotatably disposed on the first rotatable member 320. According to an embodiment, the second guide protrusion 324 of the first rotatable member 322 is guided along the second guide groove 3311 of the second rotatable member 331, so that the second rotatable member 330 is disposed to be rotatable about the first axis (X1).

According to various embodiments, a coupling structure of the guide protrusions/grooves formed in the base member 310, the first rotatable member 320, and the second rotatable member 330 may be changed in positions.

Figure 7A:
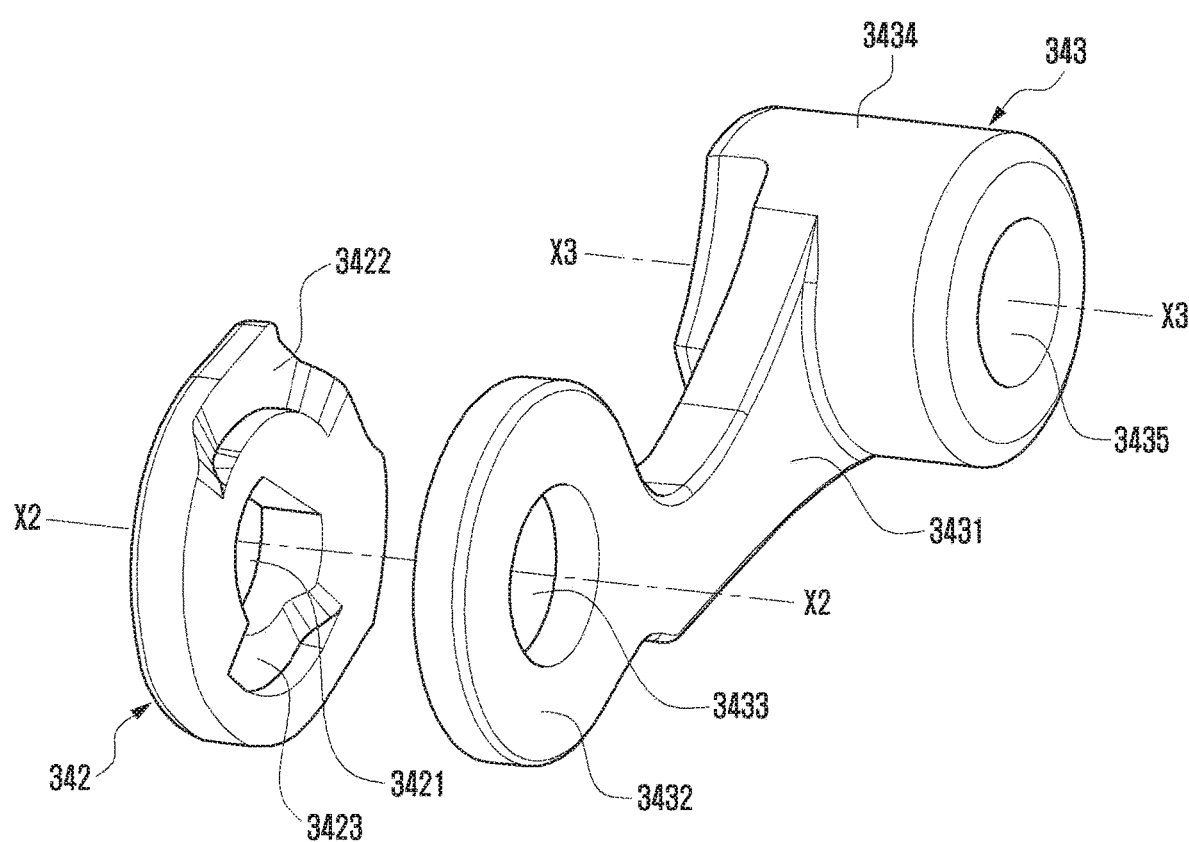
FIGS. 7A and 7B are perspective views showing coupling surfaces of a cam washer and a cam link according to various embodiments of the disclosure.
Figure 7B:
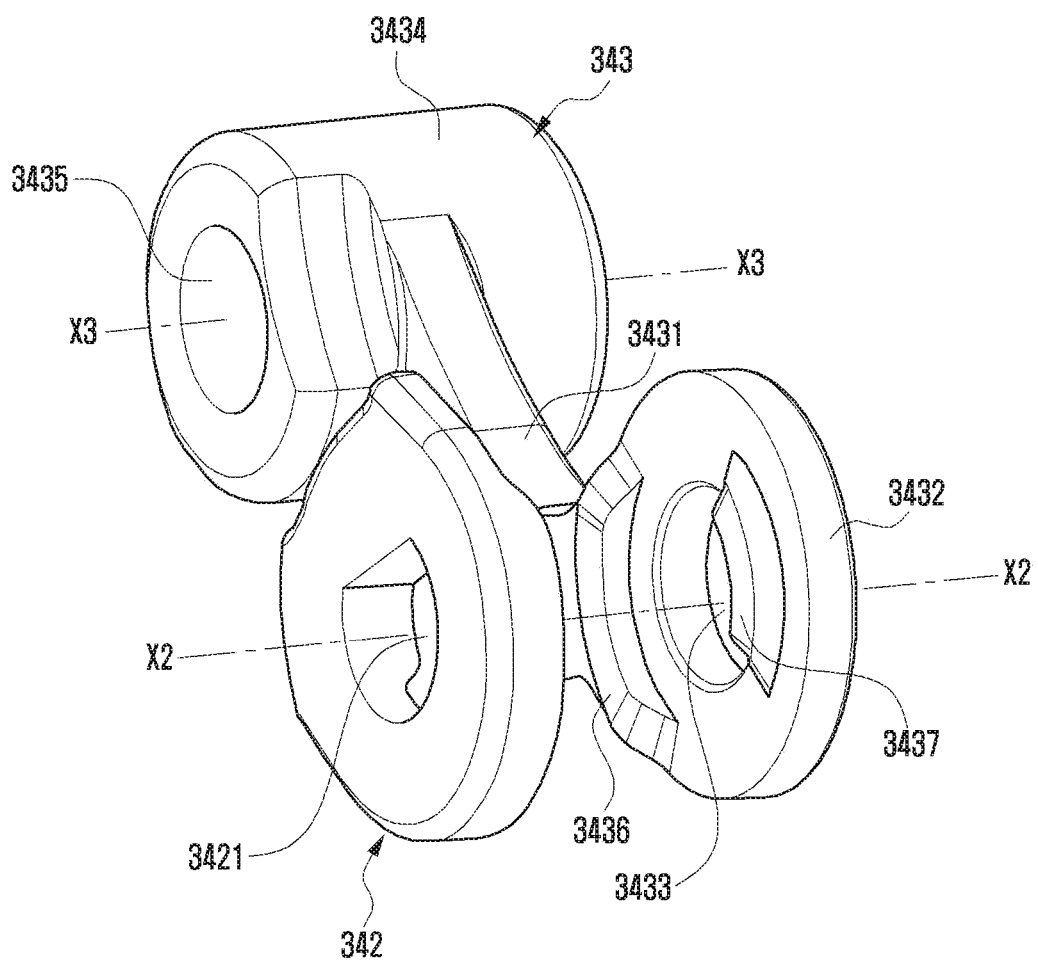

FIGS. 7A and 7B are perspective views showing coupling surfaces of a cam washer 342 and a cam link 343 according to various embodiments of the disclosure.

Referring to FIGS. 7A and 7B, the cam washer 342 and the cam disc 3432 of the cam link 343 may be arranged to be in surface contact with each other. According to an embodiment, the cam washer 342 may have a D-shaped hole 3421 to be rotatable together with the rotating shaft (e.g., 341 in FIG. 3), and the cam disc 3432 may have a circular hole 3433 to be rotatable with respect to the rotating shaft (e.g., 341 in FIG. 3). Therefore, the cam disc 3432 is movable along the second axis (X2) provided as the rotational axis of the rotating shaft (e.g., 341 in FIG. 3).

According to various embodiments, the cam washer 342 may have a pair of recesses 3422 and 3423 formed in opposite directions on a contact surface with the cam disc 3432. According to an embodiment, the first recess 3422 and the second recess 3423 may be formed to have the same center on different concentric circles. According to an embodiment, the cam disc 3432 may have a pair of cam protrusions 3436 and 3437 formed at positions corresponding to the pair of recesses 3422 and 3423 on a contact surface with the cam washer 342. According to an embodiment, the first cam protrusion 3436 corresponding to the first recess 3422 and the second cam protrusion 3437 corresponding to the second recess 3423 may be formed to have the same center on different concentric circles. When the rotating shaft (e.g., 341 in FIG. 3) is rotated, the pair of recesses 3422 and 3423 and the pair of cam protrusions 3436 and 3437 may provide a force of stably pushing the cam disc 3432 along the second axis (X2). Alternatively, only one recess and only one cam protrusion may be used.

Figure 8A:
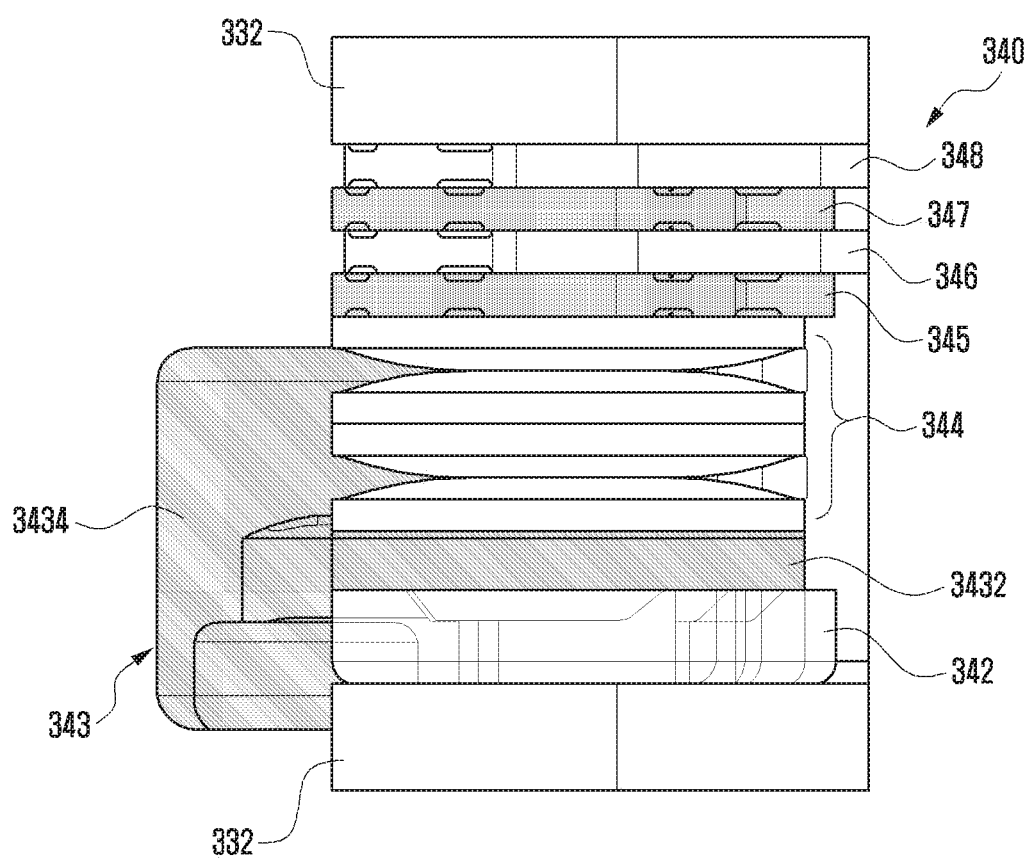
FIGS. 8A and 8B are views showing a coupling relationship between a cam washer and a cam link in an initial assembled state of a torque generating structure according to various embodiments of the disclosure.
Figure 8B:
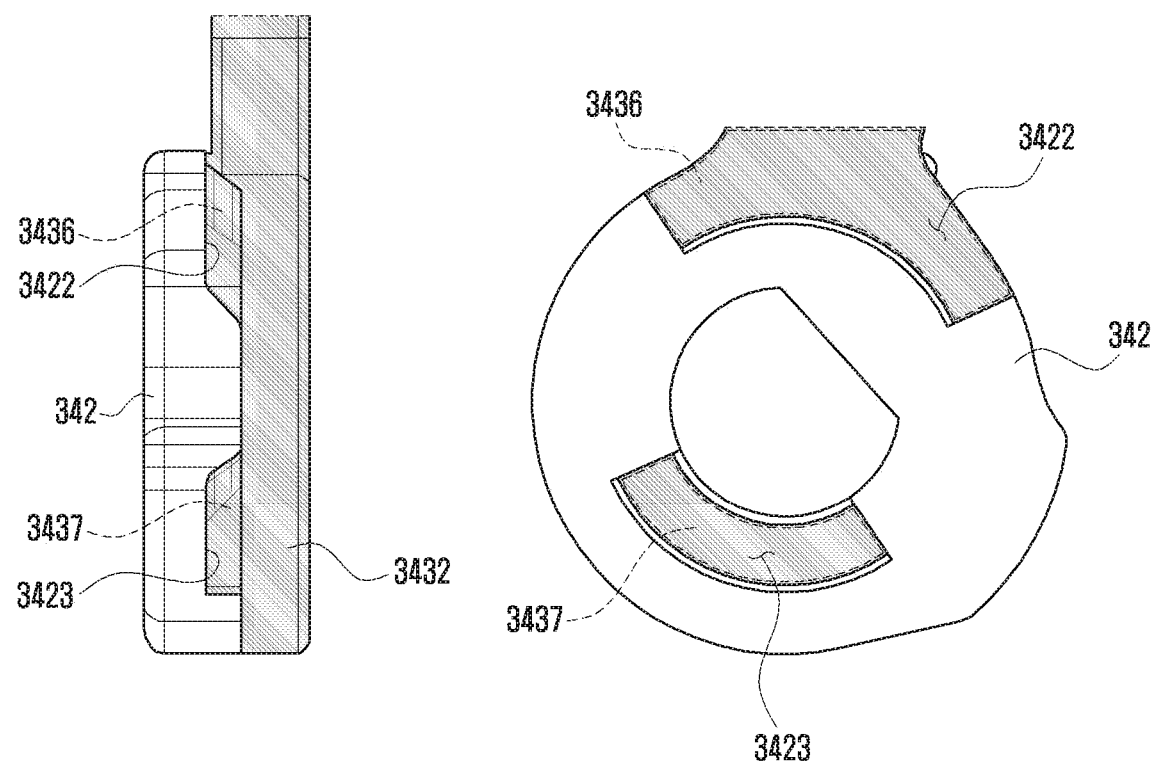

FIGS. 8A and 8B are views showing a coupling relationship between a cam washer 342 and a cam link 343 in an initial assembled state of a torque generating structure 340 according to various embodiments of the disclosure.

Referring to FIGS. 8A and 8B, in the initial assembled state of the hinge structure (e.g., 300 in FIG. 3), the cam washer 342 and the cam link 343 may be arranged to be in surface contact with each other. According to an embodiment, the first cam protrusion 3436 of the cam disc 3432 may be placed in the first recess 3422 of the cam washer 342, and the second cam protrusion 3437 of the cam disc 3432 may be placed in the second recess 3423 of the cam washer 342. In this case, the cam link 343 is in close contact with the cam washer 342 without pressing the spring 344.

Figure 9A:
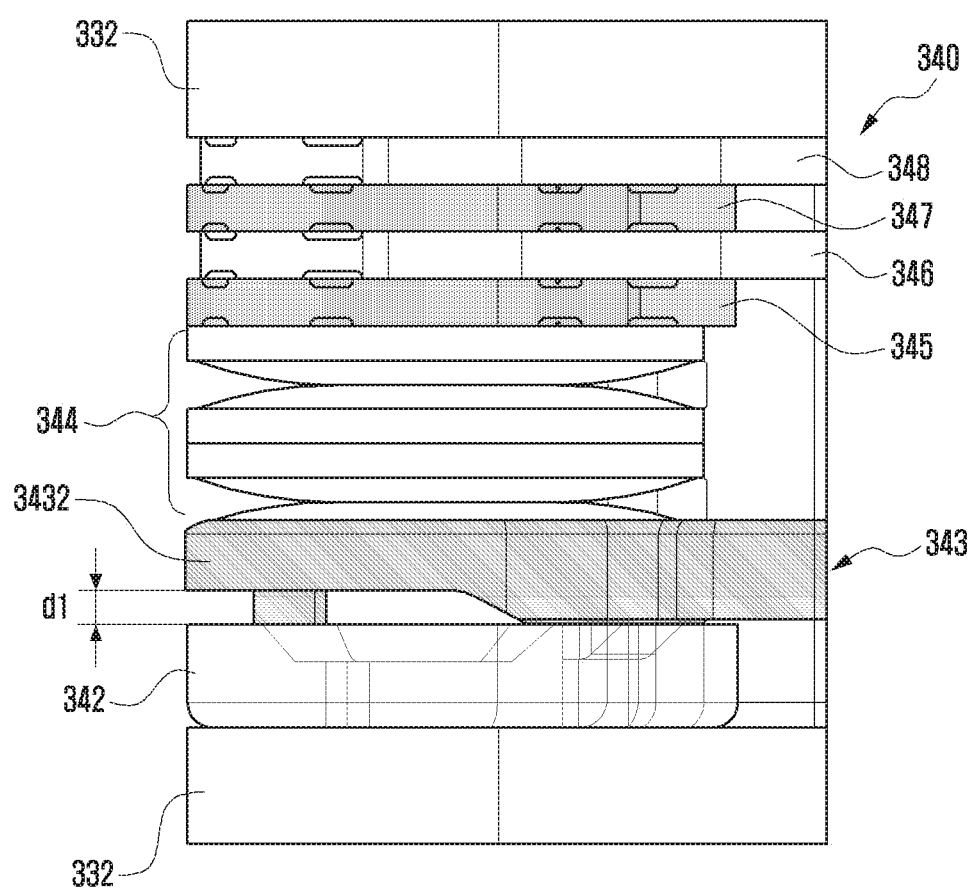
FIGS. 9A and 9B are views showing a coupling relationship between a cam washer and a cam link during operation of a torque generating structure according to various embodiments of the disclosure.
Figure 9B:
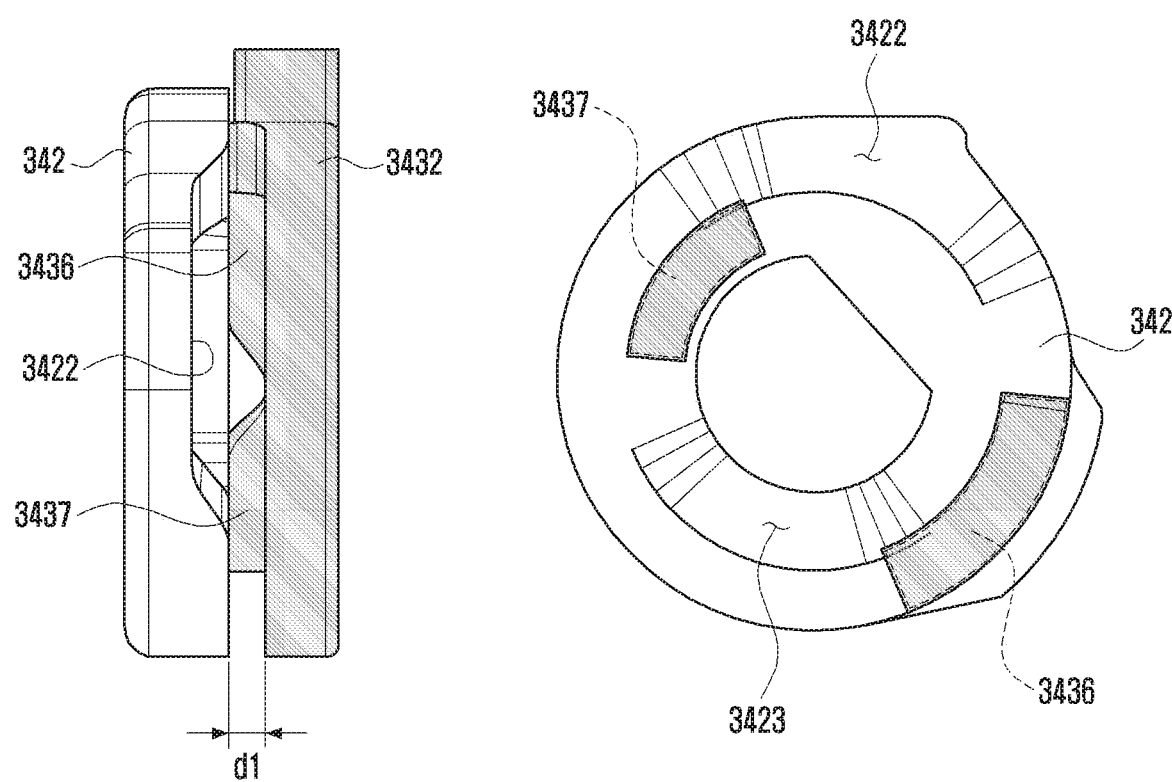

FIGS. 9A and 9B are views showing a coupling relationship between a cam washer 342 and a cam link 343 during operation of a torque generating structure 340 according to various embodiments of the disclosure.

Referring to FIGS. 9A and 9B, when the hinge structure (e.g., 300 in FIG. 3) is completely assembled to provide an opening angle of the stand member (e.g., 220 in FIG. 2D), the first cam protrusion 3436 of the cam disc 3432 may escape the first recess 3422 of the cam washer 342 and then be in contact with the contact surface of the cam washer 342, and also the second cam protrusion 3437 of the cam disc 3432 may escape the second recess 3423 of the cam washer 342 and then be in contact with the contact surface of the cam washer 342. In this case, as shown, the cam disc 3432 is moved toward the spring 344 by a protrusion length (d1) of the pair of cam protrusions 3436 and 3437 along the rotating shaft. Thus, the spring 344 is pressurized and thereby provides a certain torque by sequentially applying a mutual surface pressure to the first washer 345, the first link 346, the second washer 347, and the second link 348.

According to various embodiments, during operations to provide various opening angles of the stand member (e.g., 220 in FIG. 2D), the hinge structure (e.g., 300 in FIG. 3) can continuously provide a torque because the pair of cam protrusions 3436 and 3437 are operated without being placed in the pair of recesses 3422 and 3423.

Figure 10A:
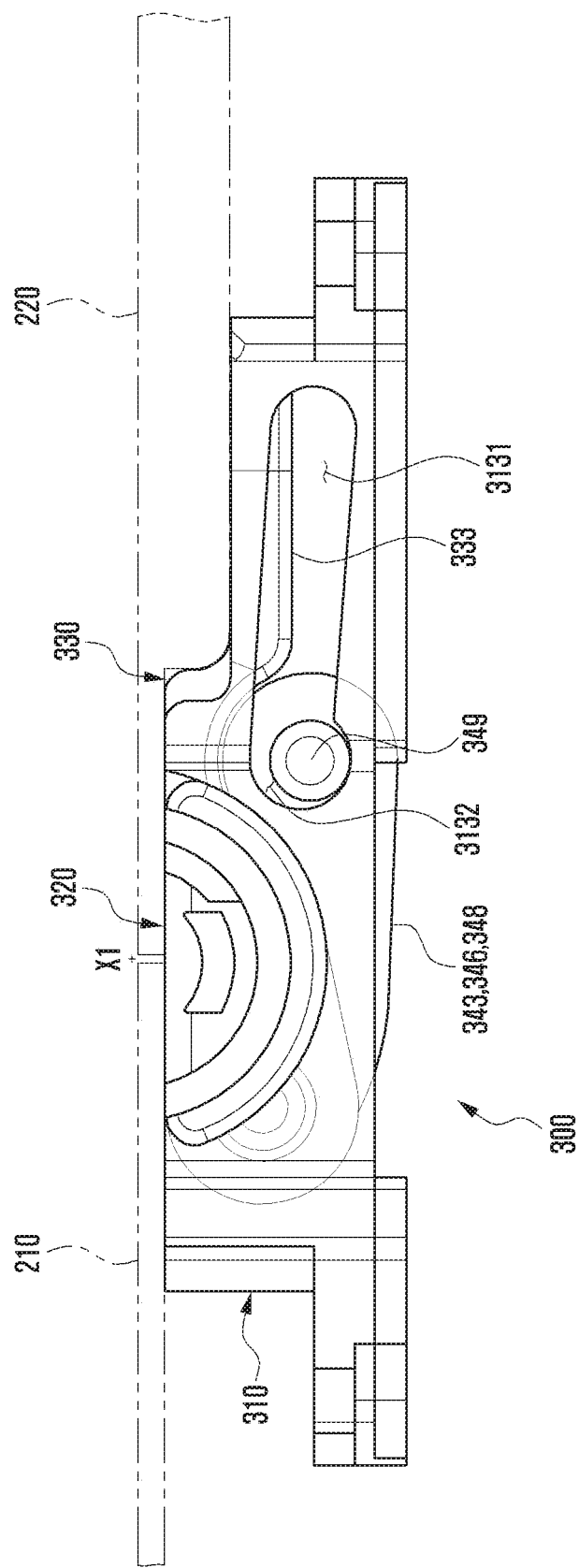
FIGS. 10A, 10B, and 10C are cross-sectional views taken along the line A-A' of FIG. 2B and showing operations of a hinge structure in a free play zone of a stand member according to various embodiments of the disclosure.
Figure 10B:
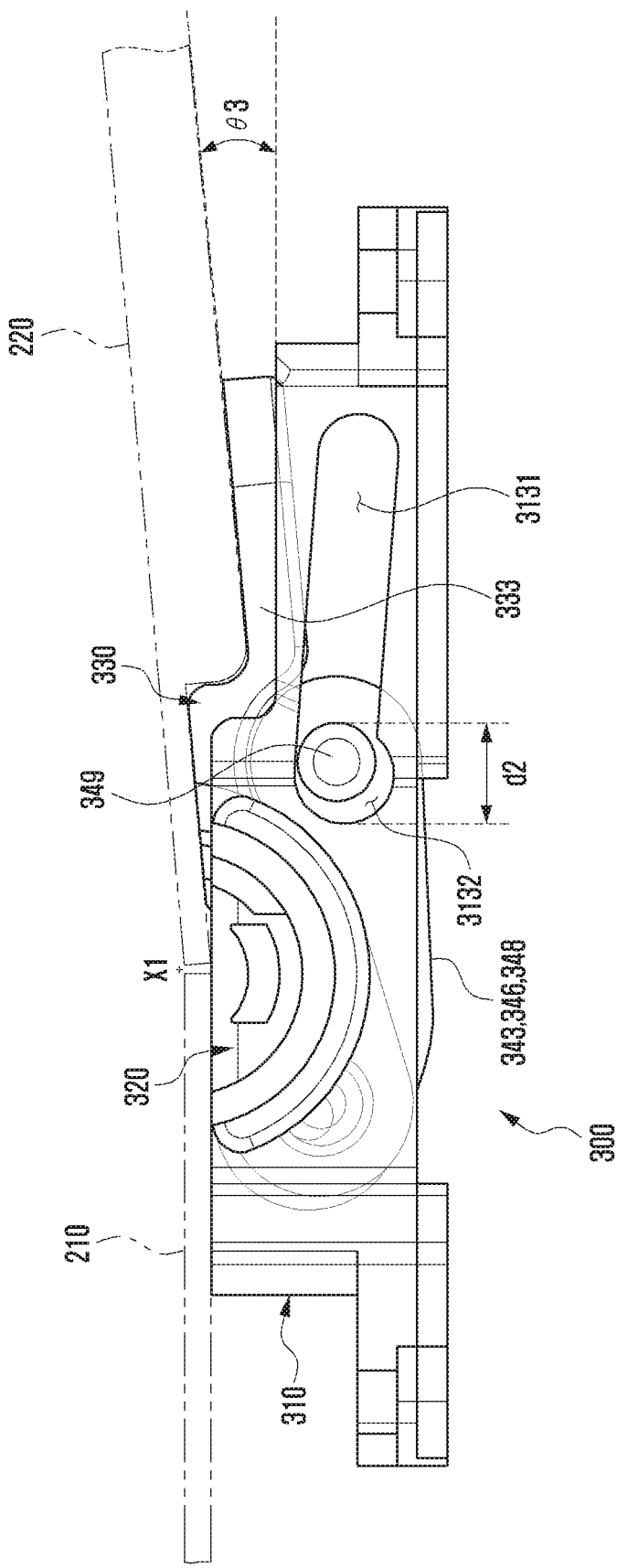
Figure 10C:
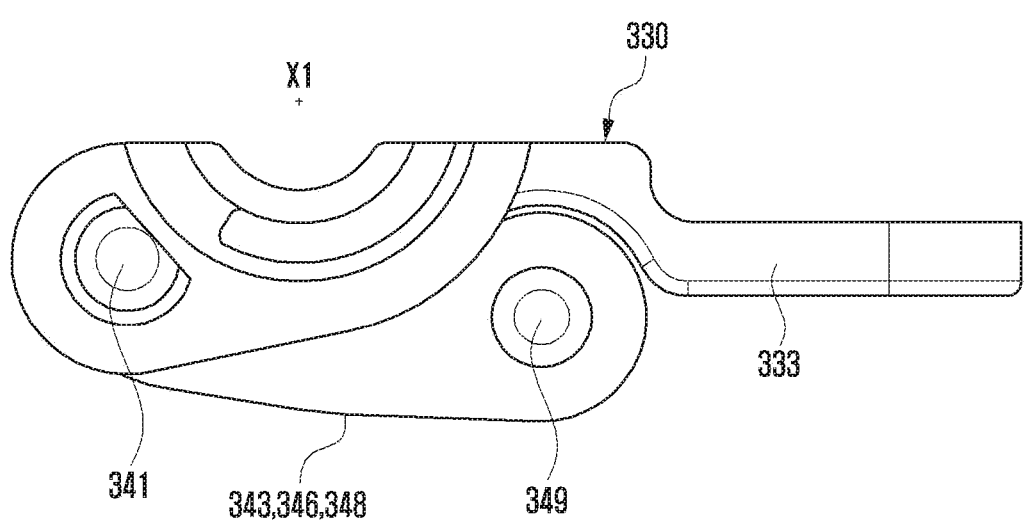

FIGS. 10A, 10B and 10C are cross-sectional views taken along the line A-A' of FIG. 2B and showing operations of a hinge structure 300 in a free play zone of a stand member 220 according to various embodiments of the disclosure.

According to an embodiment, the free play zone refers to a certain operating section in which no torque is applied to the hinge structure 300 without constraint on the guide shaft 349 when the user exerts an external force on the second rotatable member 330.

Referring to FIGS. 10A, 10B and 10C, the hinge structure 300 is capable of not only providing a primary torque through the torque generating structure (e.g., 340 in FIG. 3) engaged with the second rotatable member 330, but also providing a secondary torque caused when the guide shaft 349 inserted into the cam link 343, the first link 346, and the second link 348 performs a rectilinear motion along the guide hole 3131 of the base member 310. In this case, the hinge structure 300 can provide the secondary torque by forcibly converting a motion of the guide shaft 349, which is going to escape from the guide hole 3131 in accordance with the rotation of the second rotatable member 330 about the second axis (X2), into a rectilinear motion.

According to various embodiments, if such primary and secondary torques act together from the initial opening state of the stand member 220 being unfolded from the housing 210, it may be difficult to initially manipulate the stand member 220 due to a strong torque. Therefore, in order to provide the convenience of manipulation in the initial state where the stand member 220 is unfolded from the housing 210, the hinge structure 300 according to embodiments of the disclosure has the free play zone of generating no torque.

According to various embodiments, the hinge structure 300 may include an extension hole 3132 extending from one end of the guide hole 3131. According to an embodiment, the extension hole 3132 may be formed in a region where the guide shaft 349 is positioned in a state where the stand member 220 is completely folded to the housing 210. Also, the extension hole 3132 may be formed into a circular shape having a greater diameter than the width of the guide hole 3131. According to an embodiment, the size or shape of the extension hole 3132 is defined to provide an initial opening angle (θ3) at which the stand member 220 is relatively easily unfolded from the housing 210 without a torque.

According to various embodiments, as shown in FIGS. 10B and 10C, even if the stand member 220 is unfolded from the housing 210 at the initial opening angle (θ3) (e.g., about 0 to 5 degrees), the guide shaft 349 is moved in the extension hole 3132 of the guide hole 3131 by a certain distance (d2) without rotations of the cam link 343 and the first and second links 346 and 348. Thus, during this movement, a torque is not applied. For example, when an external force is applied to the second rotatable member 330 during this movement within the distance (d2), the guide shaft 349 is not constrained and moves together with the second rotatable member 330, and no rotation is applied to all the links 343, 346, and 348. Therefore, no torque is generated.

Figure 11A:
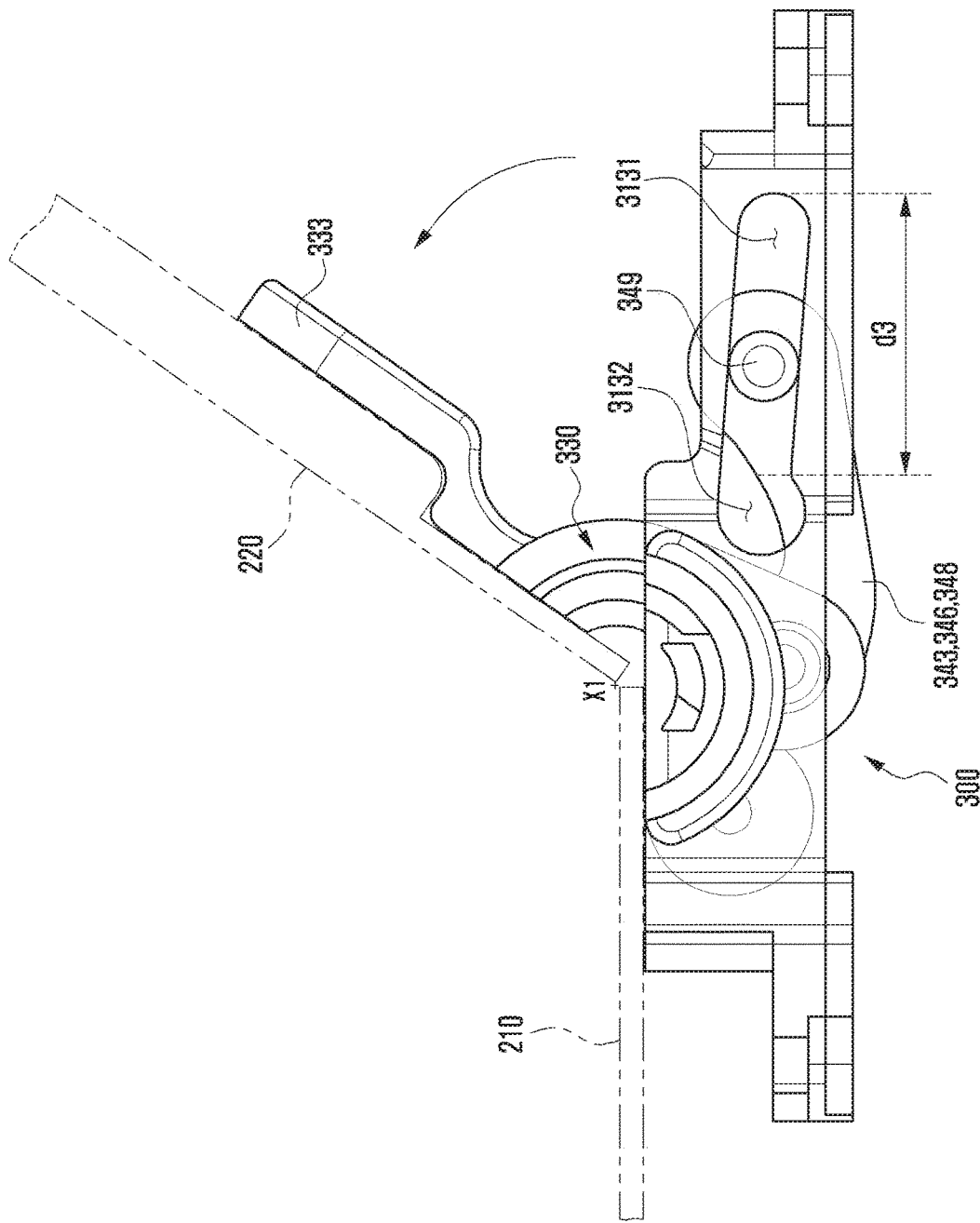
FIGS. 11A and 11B are cross-sectional views taken along the line A-A' of FIG. 2B and showing operations of a hinge structure in a torque generating zone of a stand member according to various embodiments of the disclosure.
Figure 11B:
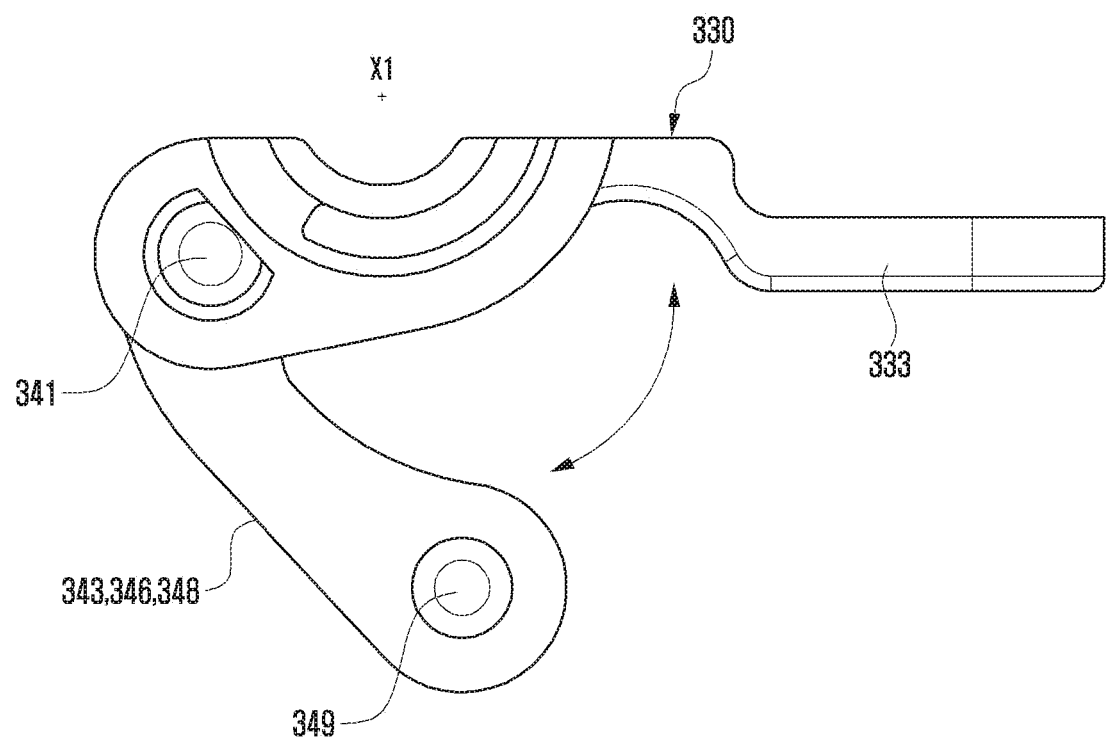

FIGS. 11A and 11B are cross-sectional views taken along the line A-A' of FIG. 2B and showing operations of a hinge structure 300 in a torque generating zone of a stand member 220 according to various embodiments of the disclosure.

Referring to FIGS. 11A and 11B, when the stand member 220 is further unfolded from the housing 210 by using the second axis (X2) as a rotation axis beyond the free play zone, the guide shaft 349 may enter the guide hole 3131 after escaping from the extension hole 3132. In this case, as shown in FIG. 11B, the guide shaft 349 is guided to perform a rectilinear motion without escaping from the guide hole 3131, so that the secondary torque can be generated.

Figure 12:
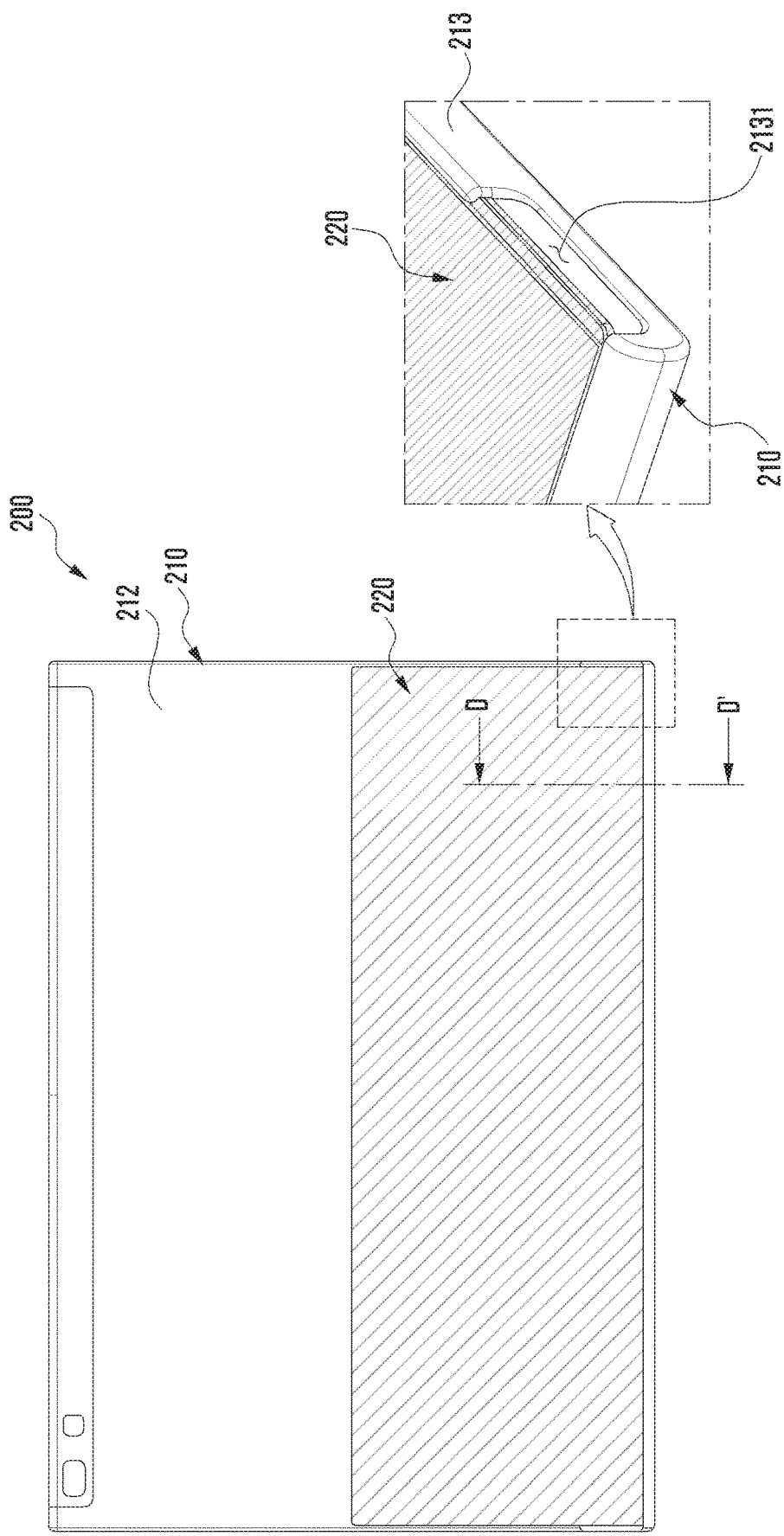
FIG. 12 is a view showing an opening mechanism of a stand member in an electronic device according to various embodiments of the disclosure.

FIG. 12 is a view showing an opening mechanism of a stand member 220 in an electronic device according to various embodiments of the disclosure.

Referring to FIG. 12, the electronic device 200 may include an opening slot 2131 disposed between the housing 210 and the stand member 220. According to an embodiment, the stand member 220 may be designed to have the outer surface coinciding with that of the second plate 212 when the housing 210 is fully folded. Thus, the user may have difficulty in lifting the stand member 220 from the housing 210. To solve this problem, the opening slot 2131 may be provided. According to an embodiment, the opening slot 2131 may be formed in the lateral member 213 and extend to the second plate 212.

Figure 13A:
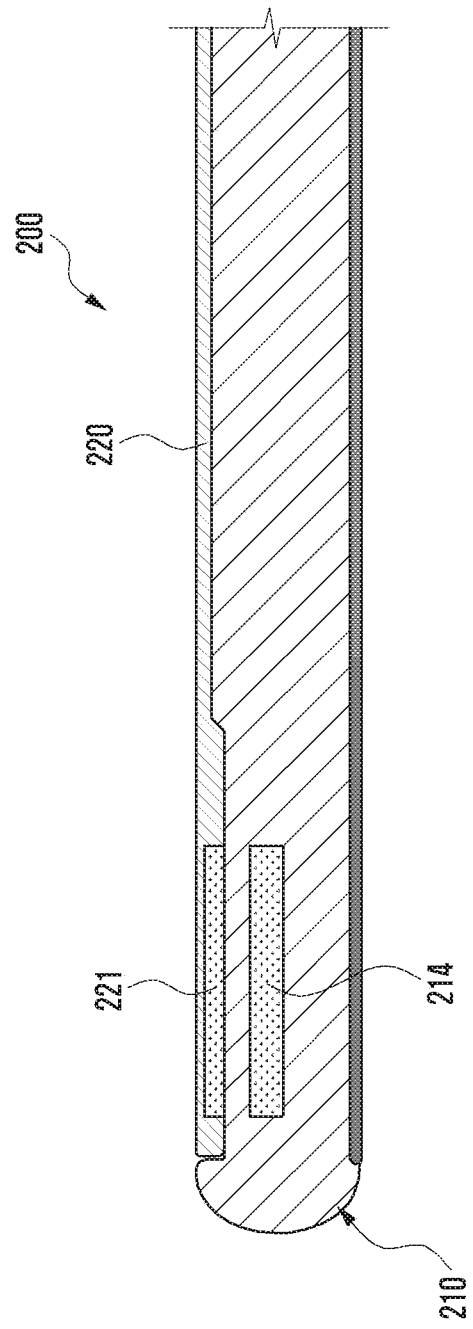
FIGS. 13A and 13B are cross-sectional views showing a closing mechanism of a stand member in an electronic device according to various embodiments of the disclosure.
Figure 13B:
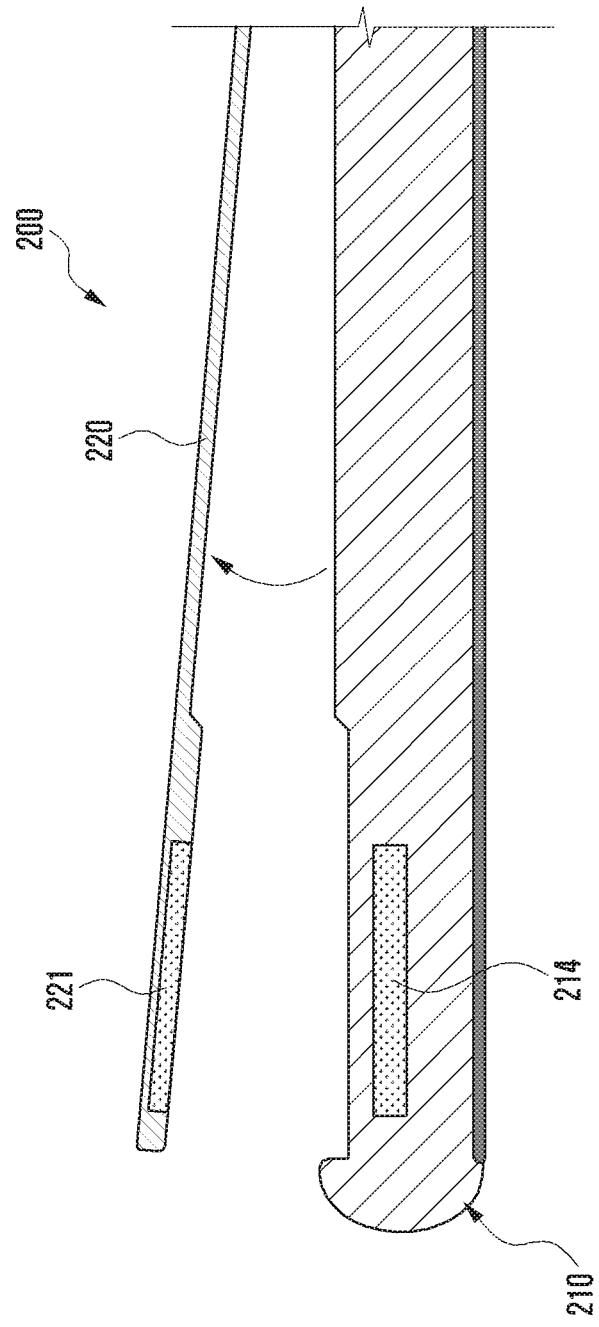

FIGS. 13A and 13B are cross-sectional views showing a closing mechanism of a stand member in an electronic device according to various embodiments of the disclosure. FIGS. 13A and 13B are cross-sectional views taken along the line D-D' of FIG. 12.

Referring to FIGS. 13A and 13B, in order to physically maintain a state in which the stand member 220 is folded with the housing 210, the electronic device 200 may include at least one magnet 214 disposed in the internal space of the housing 210. According to an embodiment, the at least one magnet 214 may be disposed near the inner surface of the second plate in the internal space of the electronic device 200. In this case, a metal member 221, which reacts to a magnetic force of the magnet 214, may be disposed at a corresponding position of the stand member 220. In another embodiment, the magnet 214 may be disposed in the stand member 220, and the metal member 221 may be disposed on the inner surface of the second plate 212.

Figure 14A:
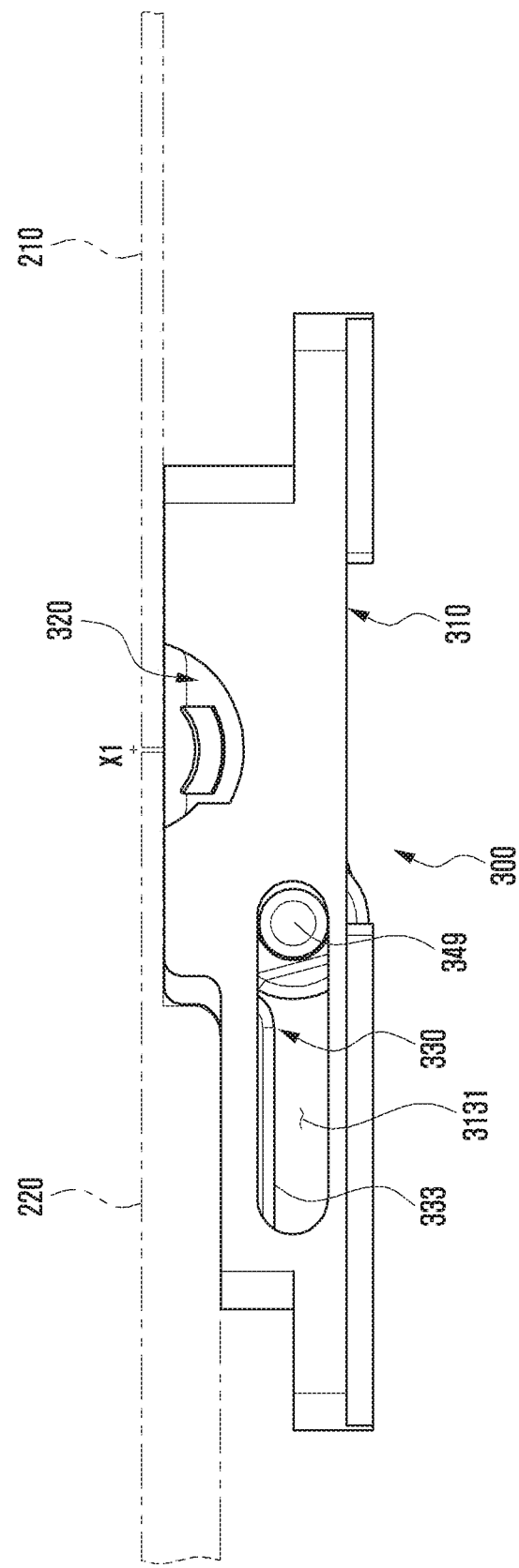
FIGS. 14A and 14B are cross-sectional views taken along the line B-B' of FIG. 2B and showing a hinge structure according to various embodiments of the disclosure.
Figure 14B:
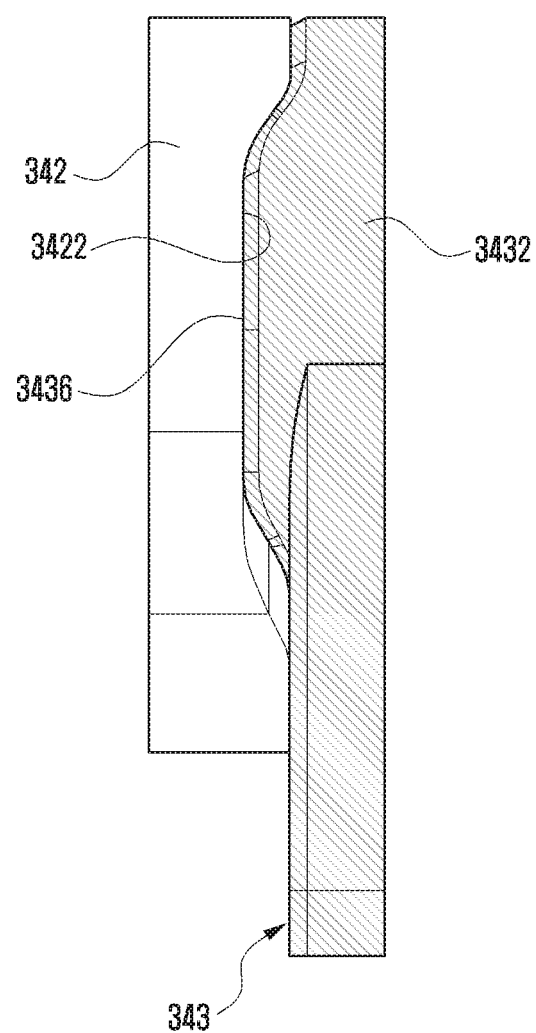

FIGS. 14A and 14B are cross-sectional views taken along the line B-B' of FIG. 2B and showing a hinge structure 300 according to various embodiments of the disclosure.

Referring to FIGS. 14A and 14B, the hinge structure 300 is capable of not only providing a primary torque through the torque generating structure (e.g., 340 in FIG. 3) engaged with the second rotatable member 330, but also providing a secondary torque caused when the guide shaft 349 is guided to perform a rectilinear motion along the guide hole 3131 of the base member 310. In this case, the hinge structure 300 can provide the secondary torque by forcibly converting a downward motion of the guide shaft 349, which is going to escape from the guide hole 3131 in accordance with the rotation of the second rotatable member 330 about the second axis (X2), into a rectilinear motion.

According to various embodiments, if such primary and secondary torques act together from the initial opening state of the stand member 220 being unfolded from the housing 210, it may be difficult to initially manipulate the stand member 220 due to a strong torque. Therefore, in order to provide the convenience of manipulation in the initial state where the stand member 220 is unfolded from the housing 210, the hinge structure 300 according to embodiments of the disclosure has the free play zone of generating no torque.

According to various embodiments, the hinge structure 300 may be configured to complete assembling in a state where the cam protrusion 3436 of the cam disc 3432 is placed in the first recess 3422 of the cam washer 342 when the stand member 220 is fully folded to the housing 210. Although not shown, such assembling may be completed in a state where the second cam protrusion (e.g., 3437 in FIG. 7B) of the cam link 343 is placed in the second recess (e.g., 3423 in FIG. 7A) of the cam washer 342.

Figure 15A:
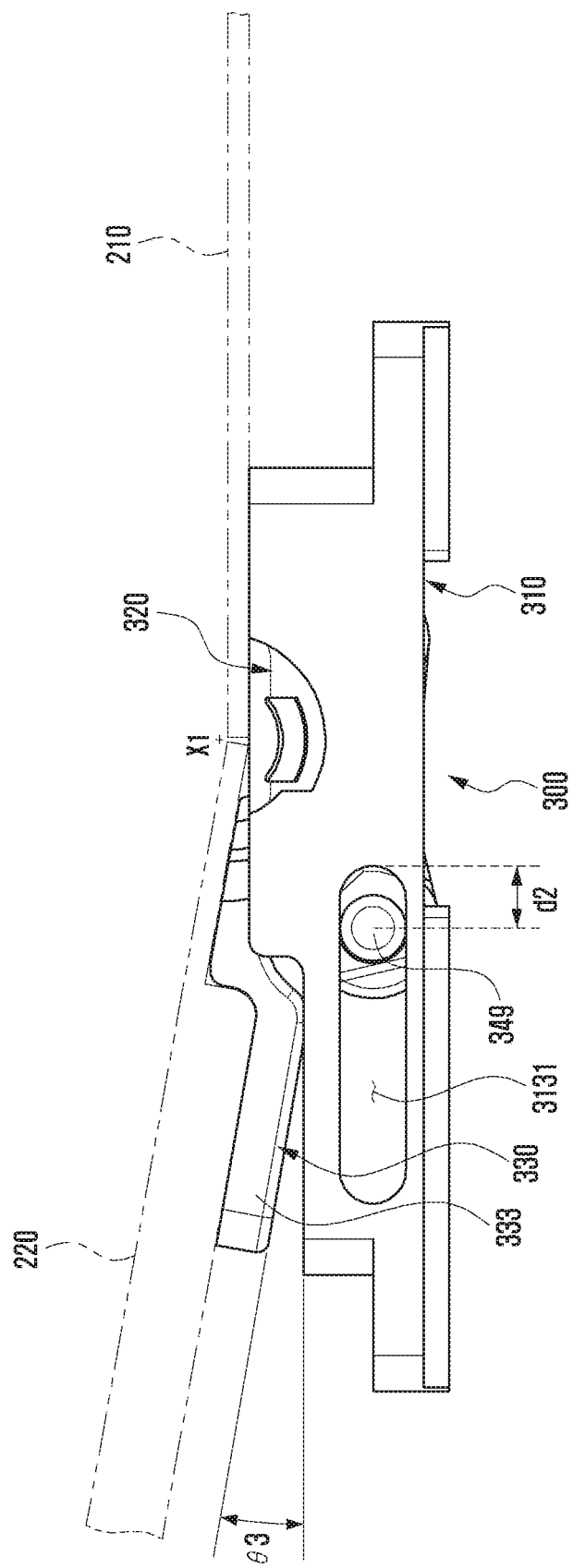
FIGS. 15A and 15B are cross-sectional views taken along the line B-B' of FIG. 2B and showing operations of a hinge structure in a free play zone of a stand member according to various embodiments of the disclosure.
Figure 15B:
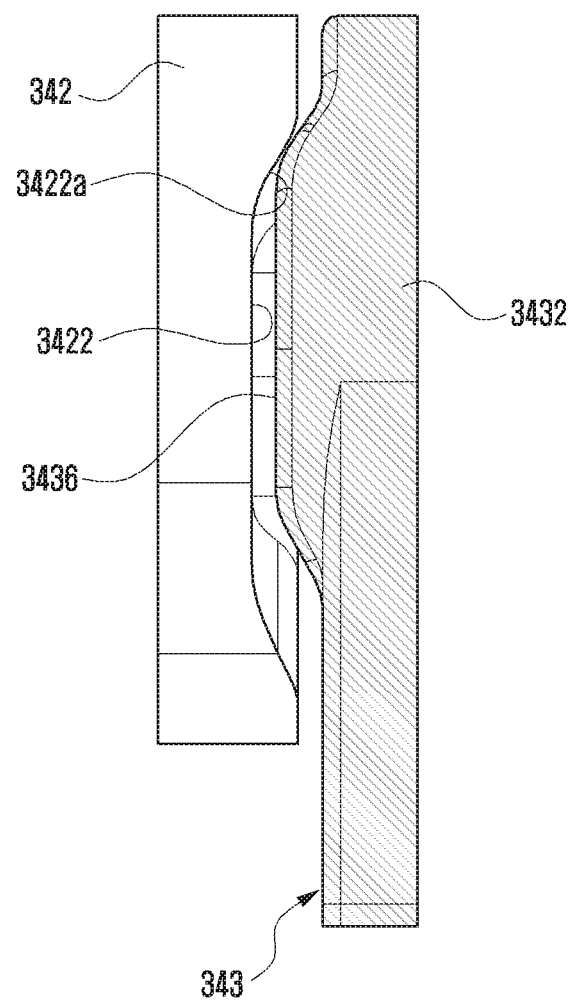

FIGS. 15A and 15B are cross-sectional views taken along the line B-B' of FIG. 2B and showing operations of a hinge structure in a free play zone of a stand member according to various embodiments of the disclosure.

Referring to FIGS. 15A and 15B, the hinge structure 300 may have the free play zone in which no torque is applied to the stand member 220 even if the guide shaft 349 is moved by a certain distance (d2) in the guide hole 3131 of the base member 310 while the first cam protrusion 3436 of the cam disc 3432 is moved within the first recess 3422 of the cam washer 342. In this case, the hinge structure 300 may provide only a torque by which the guide shaft 349 performs a rectilinear motion along the guide hole 3131. According to an embodiment, based on the size of the first recess 3422, an initial opening angle (θ3) at which the stand member 220 is relatively easily unfolded from the housing 210 without a torque generated by the torque generating structure (e.g., 340 in FIG. 3). According to an embodiment, even if the stand member 220 is unfolded from the housing 210 at the initial opening angle (θ3) (e.g., about 0 to 5 degrees), the first cam protrusion 3436 moves by a certain distance without escaping from the first recess 3422, and thereby a torque may not be applied during such movement.

Figure 16A:
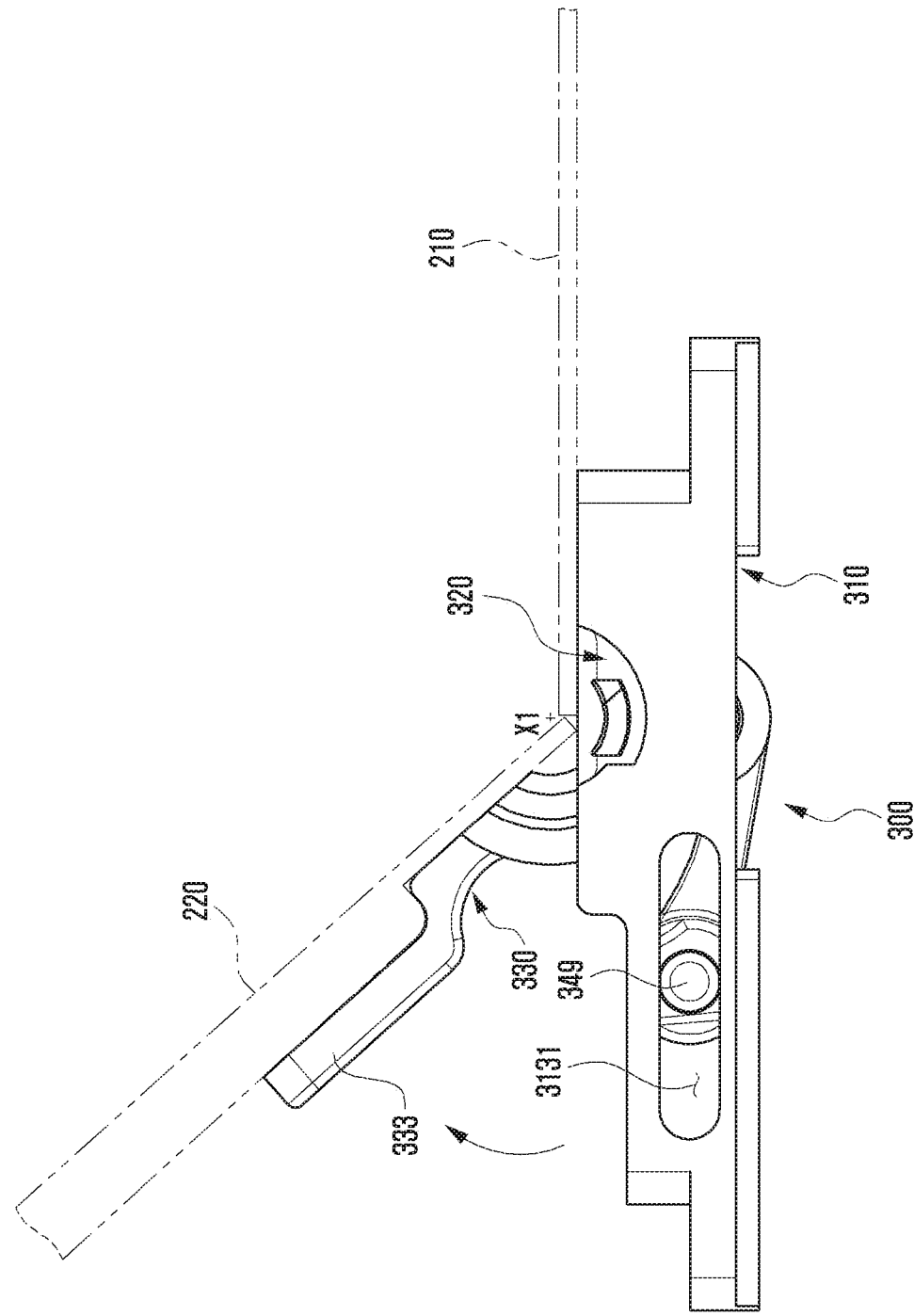
FIGS. 16A and 16B are cross-sectional views taken along the line B-B' of FIG. 2B and showing operations of a hinge structure in a torque generating zone of a stand member according to various embodiments of the disclosure.
Figure 16B:
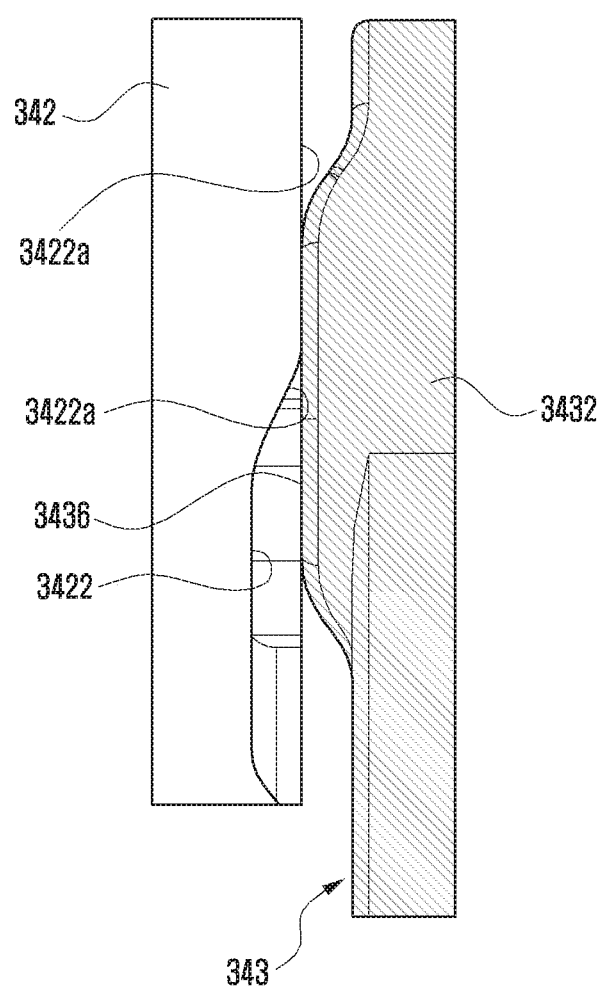

FIGS. 16A and 16B are cross-sectional views taken along the line B-B' of FIG. 2B and showing operations of a hinge structure 300 in a torque generating zone of a stand member 220 according to various embodiments of the disclosure.

Referring to FIGS. 16A and 16B, when the stand member 220 is further unfolded from the housing 210 by using the second axis (X2) as a rotation axis beyond the free play zone, the first cam protrusion 3436 is in contact with the contact surface of the cam washer 342 after exceeding an inflection region 3422a from the first recess 3422. Therefore, as described above, the cam link 343 presses the spring (e.g., 344 in FIG. 3) of the torque generating structure (e.g., 340 in FIG. 3), so that the primary torque may be further generated in addition to the secondary torque.

As fully discussed hereinbefore, the hinge structure according to various embodiments of the disclosure drives the stand member by using a torque generated when converting a rotational motion of the links into a rectilinear motion. Accordingly, the operation reliability can be improved even in frequent use, and the convenience of manipulation can be obtained through the free play zone.

According to various embodiment, an electronic device (e.g., 200 in FIG. 2A) may include a housing (e.g., 210 in FIG. 2A) including a first plate (e.g., 211 in FIG. 2A) facing in a first direction, a second plate (e.g., 212 in FIG. 2B) facing in a second direction opposite to the first direction, and a lateral member (e.g., 213 in FIG. 2A) surrounding a space between the first plate and the second plate; at least one hinge structure (e.g., 300 in FIG. 2D) disposed on at least a portion of the second plate; and a stand member (e.g., 220 in FIG. 2D) disposed to be rotated at a predetermined angle from the second plate through the hinge structure. The hinge structure may include a base member (e.g., 310 in FIG. 3) disposed on the second plate and including at least one guide hole (e.g., 3131 in FIG. 3); a first rotatable member (e.g., 320 in FIG. 3) disposed on the base member to be rotatable about a first rotational axis (e.g., X1 in FIG. 3); a second rotatable member (e.g., 330 in FIG. 3) disposed on the first rotatable member to be rotatable about the first rotational axis, and fixed, at least in part, to the stand member; at least one link (e.g., the cam link 343 in FIG. 3) each including one portion thereof rotatably arranged with respect to a second rotational axis (e.g., X2 in FIG. 3) disposed near the first rotational axis, and including another portion thereof guided through the guide hole in accordance with a movement of the second rotational axis; and a torque generating structure (e.g., 340 in FIG. 3) including an axis coinciding with the second rotational axis, and providing a torque in accordance with a rotation of the second rotatable member.

According to various embodiment, the base member may include a first surface (e.g., 311 in FIG. 3) facing a same direction as a direction of the second plate; a second surface (e.g., 312 in FIG. 3) facing a direction opposite to the direction of the first surface and facing the second plate; sidewalls (e.g., 313 in FIG. 3) surrounding a space between the first surface and the second surface; and an internal space (e.g., 3101 in FIG. 3) penetrating from the first surface to the second surface. The first rotatable member and the second rotatable member may be rotatably disposed in the internal space of the base member.

According to various embodiment, the first rotatable member may include a connecting rod (e.g., 321 in FIG. 3) having a predetermined length; a pair of first rotatable portions (e.g., 322 in FIG. 3) extended from both ends of the connecting rod; and a pair of first guide grooves (e.g., 323 in FIG. 3) each formed on an outer surface of each of the pair of first rotatable portions. The first rotatable member may be rotatable when the pair of first guide grooves receive a pair of first guide protrusions (e.g., 315 in FIG. 3) protruding from the sidewalls into the internal space of the base member.

According to various embodiment, the second rotatable member may include a second rotatable portion (e.g., 331 in FIG. 3) rotatably interposed between the pair of first rotatable portions of the first rotatable member; a pair of hinge arms (e.g., 332 in FIG. 3) each extended from one side of the second rotatable portion, being spaced apart to form a space (e.g., 3301 in FIG. 3) for receiving the torque generating structure, and providing the second rotational axis; a fixing pad (e.g., 333 in FIG. 3) extended from other side of the second rotatable portion and fixed to at least a part of the stand member; and a pair of second guide grooves (e.g., 3311 in FIG. 3) formed on both ends of the second rotatable portion. The second rotatable member may be rotatable when the pair of second guide grooves receive a pair of second guide protrusions (e.g., 324 in FIG. 3) each formed on inner surface of each of the pair of the first rotatable portions.

According to various embodiment, the first rotatable member and the second rotatable member may be disposed so as not to be protruded from the first surface of the base member in a state where the stand member is fully folded to the housing.

According to various embodiment, the torque generating structure may include a rotating shaft (e.g., 341 in FIG. 3) inserted into shaft holes (e.g., 3321 in FIG. 3) formed in the pair of hinge arms; a cam washer (e.g., 342 in FIG. 3) engaging with the rotating shaft; a cam link (e.g., 343 in FIG. 3) engaging with the rotating shaft and being, at least partly, in surface contact with the cam washer; at least one spring (e.g., 344 in FIG. 3) disposed to receive a pressure from the cam link; at least one washer (e.g., the first washer 345 and/or the second washer 347 in FIG. 3) engaging with the rotating shaft and disposed to receive a pressure from the at least one spring; and at least one link (e.g., the first link 346 and/or the second link 348 in FIG. 3) engaging with the rotating shaft and being, at least partly, in surface contact with the at least one washer.

According to various embodiment, the rotating shaft, the cam washer, and the at least one washer may be rotated together when the second rotatable member is rotated, whereas the cam link, the at least one spring, and the at least one link may be rotated with respect to the rotating shaft.

According to various embodiment, the cam link may include at least one cam protrusion (e.g., 3436 and 3437 in FIG. 7B) formed on a contact surface with the cam washer, and the cam link presses the at least one spring in a direction parallel with the second axis by a gap with the cam washer defined by a protrusion length (e.g., d1 in FIG. 9A) of the cam protrusion.

According to various embodiment, the at least one washer and the at least one link may be alternately arranged while being in surface contact with each other, and a surface pressure may be applied to the at least one washer and the at least one link through a pressing force of the at least one spring.

According to various embodiment, the cam washer may include at least one recess (e.g., 3422 and 3423 in FIG. 7A) formed on a contact surface with the cam link in a shape for receiving the cam protrusion, and the cam protrusion may be placed in the recess in case of assembly of the hinge structure and, after the assembly, escape from the recess to be in contact with the contact surface of the cam washer.

According to various embodiment, the cam link may include at least one cam protrusion formed on a contact surface with the cam washer, and the cam washer may include at least one recess formed on a contact surface with the cam link to receive the cam protrusion. In addition, the cam protrusion may be placed in the recess when the stand member is completely folded to the housing after the hinge structure is assembled, and the cam protrusion may escape from the recess to be in contact with the contact surface of the cam washer during a rotation of the stand member.

According to various embodiment, the at least one spring may include at least one disc spring into which the rotating shaft is inserted.

According to various embodiment, the torque generating structure may further include a guide shaft (e.g., 349 in FIG. 3) disposed to be guided along the guide hole of the base member, and the cam link and the at least one link may be engaged with the guide shaft to be rotated.

According to various embodiment, the guide hole may be formed in the sidewall of the base member to have a length in a direction parallel with the second plate, and the guide shaft may be guided along the guide hole in accordance with a rotation of the second rotatable member, thus generating an additional torque.

According to various embodiment, the hinge structure may further include an extension hole (e.g., 3132 in FIG. 10A) extending from the guide hole to be formed in a region where the guide shaft is positioned in a state where the stand member is completely folded to the housing, and the extension hole may be formed into a circular shape having a greater diameter than a width of the guide hole.

According to various embodiment, the extension hole may have a size of accommodating the guide shaft so as not to provide the additional torque up to an initial opening angle at which the stand member is unfolded from the housing.

According to various embodiment, the initial opening angle may be about 0 to 5 degrees.

According to various embodiment, the electronic device may further include a display (e.g., 201 in FIG. 2A) disposed in an internal space of the housing to be visible outwardly through at least a portion of the first plate.

According to various embodiment, the hinge structure may be disposed invisibly in a state where the stand member is completely folded to the housing.

According to various embodiment, an electronic device (e.g., 200 in FIG. 2A) may include a housing (e.g., 210 in FIG. 2A) including a first plate (e.g., 211 in FIG. 2A) facing in a first direction, a second plate (e.g., 212 in FIG. 2B) facing in a second direction opposite to the first direction, and a lateral member (e.g., 213 in FIG. 2A) surrounding a space between the first plate and the second plate; at least one hinge structure (e.g., 300 in FIG. 2D) disposed on at least a portion of the second plate; and a stand member (e.g., 220 in FIG. 2D) disposed to be rotated at a predetermined angle from the second plate through the hinge structure. The hinge structure may include a base member (e.g., 310 in FIG. 3) disposed on the second plate and including at least one guide hole (e.g., 3131 in FIG. 3); a first rotatable member (e.g., 320 in FIG. 3) disposed on the base member to be rotatable about a first rotational axis (e.g., X1 in FIG. 3); a second rotatable member (e.g., 330 in FIG. 3) disposed on the first rotatable member to be rotatable about the first rotational axis, and fixed, at least in part, to the stand member; at least one link (e.g., the cam link 343 in FIG. 3) each including one portion thereof rotatably arranged with respect to a second rotational axis (e.g., X2 in FIG. 3) disposed near the first rotational axis, and including another portion thereof guided through the guide hole in accordance with a movement of the second rotational axis; and a torque generating structure (e.g., 340 in FIG. 3) including an axis coinciding with the second rotational axis, and providing a torque in accordance with a rotation of the second rotatable member. The torque generating structure may include a rotating shaft (e.g., 341 in FIG. 3) inserted into a pair of hinge arms (e.g., 332 in FIG. 3) formed in the second rotatable member; a cam washer (e.g., 342 in FIG. 3) engaging with the rotating shaft; a cam link (e.g., 343 in FIG. 3) engaging with the rotating shaft and being, at least partly, in surface contact with the cam washer; at least one spring (e.g., 344 in FIG. 3) disposed to receive a pressure from the cam link; at least one washer (e.g., the first washer 345 and/or the second washer 347 in FIG. 3) engaging with the rotating shaft and disposed to receive a pressure from the at least one spring; at least one link (e.g., the first link 346 and/or the second link 348 in FIG. 3) engaging with the rotating shaft and being, at least partly, in surface contact with the at least one washer; and a guide shaft (e.g., 349 in FIG. 3) engaging with the cam link and the at least one link and disposed to be guided along the guide hole of the base member. In particular, the hinge structure may generate a primary torque through a surface pressure between the at least one washer and the at least one link which are pressed by the at least one spring through a cam operation of the cam washer and the cam link in accordance with a rotation of the stand member. In addition, the hinge structure may generate a secondary torque by forcibly converting a motion of the guide shaft, which is going to rotate together with the stand member, into a rectilinear motion guided along the guide hole.

While the disclosure has been shown described with reference to various embodiments thereof, it will be understood by those skilled in the art that various changes in form and details may be made therein without departing from the spirit and scope of the disclosure defined by the appended claims and their equivalents.

What is claimed is:

1. An electronic device comprising:
   a housing including a first plate facing in a first direction, a second plate facing in a second direction opposite to the first direction, and a lateral member surrounding a space between the first plate and the second plate;
   at least one hinge structure disposed on at least a portion of the second plate; and
   a stand member disposed to be rotated at a predetermined angle from the second plate by using the at least one hinge structure,
   wherein the at least one hinge structure comprises:
      a base member disposed on the second plate and including at least one guide hole,
      a first rotatable member disposed on the base member to be rotatable about a first rotational axis,
      a second rotatable member disposed on the first rotatable member to be rotatable about the first rotational axis, and fixed, at least in part, to the stand member,
      at least one link each including one portion thereof rotatably arranged with respect to a second rotational axis disposed near the first rotational axis, and including another portion thereof guided through the at least one guide hole in accordance with a movement of the second rotational axis, and
      a torque generating structure including an axis coinciding with the second rotational axis, and providing a torque in accordance with a rotation of the second rotatable member.

2. The electronic device of claim 1, wherein the base member includes:
a first surface facing a same direction as a direction of the second plate;
a second surface facing a direction opposite to the direction of the first surface and facing the second plate;
sidewalls surrounding a space between the first surface and the second surface; and
an internal space penetrating from the first surface to the second surface,
wherein the first rotatable member and the second rotatable member are rotatably disposed in the internal space of the base member.

3. The electronic device of claim 2, wherein the first rotatable member includes:
a connecting rod having a predetermined length;
a plurality of first rotatable portions extended from both ends of the connecting rod; and
a plurality of first guide grooves each formed on an outer surface of each of the plurality of first rotatable portions,
wherein the first rotatable member is rotatable when the plurality of first guide grooves receive corresponding first guide protrusions protruding from the sidewalls into the internal space of the base member.

4. The electronic device of claim 3, wherein the second rotatable member includes:
a second rotatable portion rotatably interposed between the plurality of first rotatable portions of the first rotatable member;
a plurality of hinge arms each extended from one side of the second rotatable portion, being spaced apart to form a space for receiving the torque generating structure, and providing the second rotational axis;
a fixing pad extended from another side of the second rotatable portion and fixed to at least a part of the stand member; and
a plurality of second guide grooves formed on both ends of the second rotatable portion,
wherein the second rotatable member is rotatable when the plurality of second guide grooves receive corresponding second guide protrusions each formed on an inner surface of one of the plurality of first rotatable portions.

5. The electronic device of claim 4, wherein the first rotatable member and the second rotatable member are disposed so as not to protrude from the first surface of the base member in a state where the stand member is fully folded to the housing.

6. The electronic device of claim 4, wherein the torque generating structure includes:
a rotating shaft inserted into shaft holes formed in the plurality of hinge arms;
a cam washer engaging with the rotating shaft;
a cam link engaging with the rotating shaft and being, at least partly, in surface contact with the cam washer;
at least one spring disposed to receive a pressure from the cam link;
at least one washer engaging with the rotating shaft and disposed to receive a pressure from the at least one spring; and
the at least one link engaging with the rotating shaft and being, at least partly, in surface contact with the at least one washer.

7. The electronic device of claim 6,
wherein the rotating shaft, the cam washer, and the at least one washer are rotated together when the second rotatable member is rotated, and
wherein the cam link, the at least one spring, and the at least one link are rotatable with respect to the rotating shaft.

8. The electronic device of claim 7,
wherein the cam link includes at least one cam protrusion formed on a contact surface with the cam washer, and
wherein the cam link presses the at least one spring in a direction parallel with the second rotational axis by a gap with the cam washer defined by a length of the at least one cam protrusion.

9. The electronic device of claim 8,
wherein the at least one washer and the at least one link are alternately arranged while being in surface contact with each other, and
wherein a surface pressure is applied to the at least one washer and the at least one link through a pressing force of the at least one spring.

10. The electronic device of claim 8,
wherein the cam washer includes at least one recess formed on a contact surface with the cam link in a shape for receiving the at least one cam protrusion, and
wherein the at least one cam protrusion is disposed in the recess during assembly of the at least one hinge structure and, after the assembly, escapes from the recess to be in contact with the contact surface of the cam washer.

11. The electronic device of claim 7,
wherein the cam link includes at least one cam protrusion formed on a contact surface with the cam washer,
wherein the cam washer includes at least one recess formed on a contact surface with the cam link to receive the at least one cam protrusion, and
wherein the at least one cam protrusion is disposed in the recess when the stand member is completely folded to the housing after the hinge structure is assembled, and the at least one cam protrusion escapes from the recess to be in contact with the contact surface of the cam washer during a rotation of the stand member.

12. The electronic device of claim 6, wherein the at least one spring includes at least one disc spring into which the rotating shaft is inserted.

13. The electronic device of claim 6,
wherein the torque generating structure further includes a guide shaft disposed to be guided along the at least one guide hole of the base member, and
wherein the cam link and the at least one link are engaged with the guide shaft to be rotated.

14. The electronic device of claim 13,
wherein the at least one guide hole is formed in the sidewalls of the base member to have a length in a direction parallel with the second plate, and
wherein the guide shaft is guided along the at least one guide hole in accordance with a rotation of the second rotatable member, thereby generating an additional torque.

15. The electronic device of claim 14,
wherein the at least one hinge structure further includes an extension hole extending from the at least one guide hole in a region where the guide shaft is positioned in a state where the stand member is completely folded to the housing, and
wherein the extension hole comprises a circular shape having a greater diameter than a width of the at least one guide hole.

16. The electronic device of claim 15, wherein the extension hole has a size accommodating the guide shaft so as not to provide the additional torque up to an initial opening angle at which the stand member is unfolded from the housing.

17. The electronic device of claim 16, wherein the initial opening angle is in a range from 0 to approximately 5 degrees.

18. The electronic device of claim 1, further comprising:
a display disposed in an internal space of the housing and outwardly visible through at least a portion of the first plate.

19. The electronic device of claim 1, wherein the at least one hinge structure is not visible when the stand member is completely folded to the housing.

20. An electronic device comprising:
a housing including a first plate facing in a first direction, a second plate facing in a second direction opposite to the first direction, and a lateral member surrounding a space between the first plate and the second plate;
at least one hinge structure disposed on at least a portion of the second plate; and
a stand member disposed to be rotated at a predetermined angle from the second plate by using the at least one hinge structure,
wherein the at least one hinge structure comprises:
a base member disposed on the second plate and including at least one guide hole,
a first rotatable member disposed on the base member to be rotatable about a first rotational axis,
a second rotatable member disposed on the first rotatable member to be rotatable about the first rotational axis, and fixed, at least in part, to the stand member,
at least one link each including one portion thereof rotatably arranged with respect to a second rotational axis disposed near the first rotational axis, and including another portion thereof guided through the at least one guide hole in accordance with a movement of the second rotational axis, and
a torque generating structure including an axis coinciding with the second rotational axis, and providing a torque in accordance with a rotation of the second rotatable member,
wherein the torque generating structure includes:
a rotating shaft inserted into a pair of hinge arms formed in the second rotatable member,
a cam washer engaging with the rotating shaft,
a cam link engaging with the rotating shaft and being, at least partly, in surface contact with the cam washer,
at least one spring disposed to receive a pressure from the cam link,
at least one washer engaging with the rotating shaft and disposed to receive a pressure from the at least one spring,
the at least one link engaging with the rotating shaft and being, at least partly, in surface contact with the at least one washer, and
a guide shaft engaging with the cam link and the at least one link and disposed to be guided along the at least one guide hole of the base member,
wherein the at least one hinge structure generates a primary torque through a surface pressure between the at least one washer and the at least one link which are pressed by the at least one spring through a cam operation of the cam washer and the cam link in accordance with a rotation of the stand member, and
wherein the at least one hinge structure generates a secondary torque by forcibly converting a motion of the guide shaft, which is going to rotate together with the stand member, into a rectilinear motion guided along the at least one guide hole.

* * * * *